US011216309B2

(12) United States Patent
Piercey et al.

(10) Patent No.: US 11,216,309 B2
(45) Date of Patent: Jan. 4, 2022

(54) USING MULTIDIMENSIONAL METADATA TAG SETS TO DETERMINE RESOURCE ALLOCATION IN A DISTRIBUTED COMPUTING ENVIRONMENT

(71) Applicant: Juniper Networks, Inc., Sunnyvale, CA (US)

(72) Inventors: Charles Arthur Piercey, Mountain View, CA (US); Aniket G. Daptari, San Jose, CA (US); Prasad Miriyala, San Jose, CA (US); Erwin Daria, Emeryville, CA (US); William Stuart Mackie, Carmel, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 202 days.

(21) Appl. No.: 16/444,971

(22) Filed: Jun. 18, 2019

(65) Prior Publication Data
US 2020/0401452 A1  Dec. 24, 2020

(51) Int. Cl.
*G06F 9/455* (2018.01)
*G06F 9/50* (2006.01)

(52) U.S. Cl.
CPC ........ *G06F 9/5027* (2013.01); *G06F 9/45558* (2013.01); *G06F 9/5016* (2013.01); *G06F 2009/45595* (2013.01)

(58) Field of Classification Search
CPC .. G06F 9/5027; G06F 9/45558; G06F 9/5016; G06F 2009/45595
See application file for complete search history.

(56) References Cited

U.S. PATENT DOCUMENTS 6,292,900 B1  9/2001 Ngo et al.
7,516,475 B1  4/2009 Chen et al.
(Continued)

FOREIGN PATENT DOCUMENTS

CN  103763367 A  4/2014
CN  103414631 A  9/2016
(Continued)

OTHER PUBLICATIONS

Bielicki, "LizardFS Documentation," accessed from https://buildmedia.readthedocs.org/media/pdf/lizardfs-docs/stable/lizardfs-docs.pdf, Jun. 15, 2018, 147 pp.
(Continued)

*Primary Examiner* — Dong U Kim
(74) *Attorney, Agent, or Firm* — Shumaker & Sieffert, P.A.

(57) ABSTRACT

An example method includes receiving a resource request for at least one compute and/or storage resource from a distributed computing system distributed among multiple data centers, determining a resource policy that is associated with the resource request, wherein the resource policy includes a rule specifying at least one metadata tag and at least one criterion associated with the at least one metadata tag, identifying at least one object included in a resource object model that complies with the rule of the resource policy, wherein the at least one object has an assigned value for the metadata tag that satisfies the at least one criterion, selecting a data center that is associated with the at least one object identified from the resource object model, and deploying, on the selected data center, the at least one compute or storage resource.

22 Claims, 12 Drawing Sheets

(56) References Cited

U.S. PATENT DOCUMENTS

| | | | |
|---|---|---|---|
| 7,546,629 | B2 | 6/2009 | Albert et al. |
| 7,860,006 | B1 | 12/2010 | Kashyap et al. |
| 8,099,774 | B2 | 1/2012 | Abzarian et al. |
| 8,301,746 | B2 | 10/2012 | Head et al. |
| 9,282,164 | B2 | 3/2016 | Finn et al. |
| 9,680,875 | B2 | 6/2017 | Knjazihhin et al. |
| 10,116,732 | B1* | 10/2018 | Canton ............... H04L 41/0813 |
| 10,728,288 | B2 | 7/2020 | Miriyala |
| 10,742,557 | B1 | 8/2020 | Miriyala et al. |
| 10,778,724 | B1 | 9/2020 | Miriyala et al. |
| 2005/0180398 | A1 | 8/2005 | Deno et al. |
| 2006/0022816 | A1 | 2/2006 | Yukawa |
| 2006/0075198 | A1 | 4/2006 | Susaki et al. |
| 2007/0169186 | A1 | 7/2007 | Ueoka et al. |
| 2009/0070268 | A1 | 3/2009 | Sarkissian et al. |
| 2011/0055367 | A1 | 3/2011 | Dollar |
| 2012/0005724 | A1 | 1/2012 | Lee |
| 2013/0182722 | A1 | 7/2013 | Vishveswaraiah et al. |
| 2014/0033268 | A1 | 1/2014 | Julisch et al. |
| 2014/0245423 | A1 | 8/2014 | Lee |
| 2014/0280838 | A1* | 9/2014 | Finn ........................ H04L 49/00 709/223 |
| 2015/0081893 | A1 | 3/2015 | Chadwell et al. |
| 2015/0124809 | A1 | 5/2015 | Edsall et al. |
| 2015/0341223 | A1* | 11/2015 | Shen ..................... G06F 9/5027 709/223 |
| 2016/0055354 | A1 | 2/2016 | Jinaraj et al. |
| 2016/0261486 | A1 | 9/2016 | Fang et al. |
| 2018/0109450 | A1 | 4/2018 | Filsfils et al. |
| 2018/0316729 | A1 | 11/2018 | Chauvet et al. |
| 2019/0014124 | A1 | 1/2019 | Reddy et al. |
| 2019/0068690 | A1 | 2/2019 | Canton et al. |
| 2019/0158541 | A1 | 5/2019 | Miriyala et al. |
| 2019/0361727 | A1* | 11/2019 | Thakkar ............. G06F 9/45558 |

FOREIGN PATENT DOCUMENTS

| | | |
|---|---|---|
| CN | 106685903 A | 4/2021 |
| WO | 2013/184846 A1 | 12/2013 |
| WO | 201703699 A1 | 1/2017 |
| WO | 2017/064560 A1 | 4/2017 |
| WO | 2017064560 A1 | 4/2017 |

OTHER PUBLICATIONS

"LizardFS, White paper Version 3.12," accessed from https://lizardfs.com/wp-content/uploads/2018/06/whitepaper_lizard_v3_12_web.pdf, Jun. 2018, 23 pp.

"LizardFS, White paper Version 3.10," accessed from https://lizardfs.com/wp-content/uploads/2017/01/LizardFS-WhitePaper-Eng-v9-3.10-web-18oct-small.pdf, Jan. 2017, 20 pp.

"Introduction to LizardFS," LizardFS Handbook, accessed from https://docs.lizardfs.com/introduction.html, accessed on May 7, 2020, 4 pp.

"What Lizard Gives You," Lizard FS, accessed from https://lizardfs.com/, accessed on May 7, 2020, 4 pp.

"LizardFS is an Open Source Distributed File System licensed under GPLv3," GitHub, LizardFS, accessed from https://github.com/lizardfs/lizardfs, accessed on May 7, 2020, 2 pp.

"Welcome to LizardFS's documentation," LizardFS Handbook, accessed from https://docs.lizardfs.com/, accessed on May 7, 2020, 3 pp.

Youtube, "FOSDEM 2017—Storage overloaded to smoke? Legolize with LizardFS!," uploaded by LizardFS Software Defined Storage, Feb. 7, 2017, accessed from https://www.youtube.com/watch?v=gz3XAfAbfxl, 1 pp.

Youtube, "LizardFS on FOSDEM 2018 "Year in Development,"" uploaded by LizardFS Software Defined Storage, Mar. 2, 2018, accessed from https://www.youtube.com/watch?v=vpaanFRRjBk, 1 pp.

Youtube, "LizardFS as a storage for Elasticsearch," uploaded by LizardFS Software Defined Storage, Sep. 14, 2018, accessed from https://www.youtube.com/watch?v=jSodzbA2o9l, 1 pp.

Youtube, "LizardFS Intro," uploaded by LizardFS Software Defined Storage, Aug. 7, 2018, accessed from https://www.youtube.com/watch?v=oPASAHS2-D0, 1 pp.

Youtube, "LizardFS presentation," uploaded by LizardFS Software Defined Storage, Mar. 28, 2018, accessed from https://www.youtube.com/watch?v=H9dOue6EJz0, 1 pp.

Youtube, "FOSDEM 2018 Lizardfs Opennebula Connector release," uploaded by LizardFS Software Defined Storage, Mar. 2, 2018, accessed from https://www.youtube.com/watch?v=MFP1CvggpEM, 1 pp.

Youtube, "LizardFS Software Defined Sotrage," uploaded by LizardFS Software Defined Storage, Aug. 16, 2016, accessed from https://www.youtube.com/watch?v=ILjZD97Lbo4, 1 pp.

Youtube, "LizardFS @ Platige Image," uploaded by LizardFS Software Defined Storage, Jun. 22, 2016, accessed from https://www.youtube.com/watch?v=dZ4Fx48d3jM, 1 pp.

YouTube," LizardFS native Windows client," uploaded by LizardFS Software Defined Storage, Jun. 21, 2016, accessed from https:/www.youtube.com/watch?v=KKDaeVALHV4, 1 pp.

Droms, R. "Dynamic Host Configuration Protocol" Network Working Group, RFC 2131, Mar. 1997, 45 pp.

Enns et al. "Network Configuration Protocol (NETCONF)" Internet Engineering Task Force (IETF), RFC 6241, Jun. 2011, 113 pp.

Mockapetris, P. "Domain Names—Concepts and Facilities" Network Working Group, RFC 1034, Nov. 1987, 55 pp.

Mockapetris, P. "Domain Names—Implementation and Specification" Network Working Group, RFC 1035, Nov. 1987, 55 pp.

U.S. Appl. No. 15/819,522, filed Nov. 21, 2017, Juniper Networks, Inc. (inventor: Miriyala et al.), entitled Scalable Policy Management for Virtual Networks.

U.S. Appl. No. 15/476,136, Juniper Networks, Inc. (inventor: Mehta et al.), entitled "Session-Based Traffic Statistics Logging for Virtual Routers", filed Mar. 31, 2017.

Sangli et al., "BGP Extended Communities Attribute," RFC 4360, Network Working Group, Feb. 2006, 12 pp.

Sajassi et al., "BGP MPLS-Based Ethernet VPN," RFC 7432, Internet Engineering Task Force (IETF), Feb. 2015, 56 pp.

"Juniper / Contrail-specs / fw_security_enhancements.md," GitHub, May 20, 2017, accessed from https://github.com/Juniper/contrail-specs/blob/master/fw_security_enhancements.md, 10 pp.

"Service group and Service Object support," OpenStack Neutron Team, OpenStack Cloud Software, last updated Mar. 17, 2015, accessed from http://specs.openstack.org/openstack/neutron-specs/specs/kilo/service-group.html, 7 pp.

"Firewall as a Service API 2.0," OpenStack Neutron Team, OpenStack Cloud Software, last updated Sep. 21, 2017, accessed from https://specs.openstack.org/openstack/neutron-specs/specs/newton/fwaas-api-2.0.html, 31 pp.

"3.2 Rules Headers," SNORTUsers Manual 2.9.11, Applicant points out, in accordance with MPEP 609.04(a), that the year of publication, 2008, is sufficiently earlier than the effective U.S. filing date, 2017, so that the particular month of publication is not an issue, accessed from http://manual-snort-org.s3-website-US-east-1.amazonaws.com/node29.html#SECTION00421000000000000000, 4 pp.

U.S. Appl. No. 16/355,289, filed Mar. 15, 2019 entitled "Storage Volume Replication Across Multiple Data Centers", Juniper Networks, Inc. (inventor: Echegaray et al.).

U.S. Appl. No. 16/118,107, filed Aug. 30, 2018 entitled "Multiple Virtual Network Interface Support for Virtual Execution Elements", Juniper Networks, Inc. (inventor:Rao et al.).

Extended European Search Report from counterpart European Application No. 19199139.7, dated Feb. 18, 2020, 9 pp.

Nutanix, Apr. 9, 2019, available at https://www.nutanix.com/blog/building-things-people-like (last accessed Aug. 22, 2019), 4 pp.

"ClearSky Takes Primary Storage 'to the Cloud'" A DeepStorage Technology Validation Report, DeepStorage, LLC Aug. 31, 2015, 15 pp.

"Container Orchestration Services" Mesosphere, Mar. 24, 2016, available at www.mesosphere.com > solutions > container-orchestration (last accessed Aug. 22, 2019), 7 pp.

(56) References Cited

OTHER PUBLICATIONS

"Run Kubernetes Everywhere" Container Orchestration, Kubernetes Management, Rancher.com (last accessed Aug. 22, 2019), May 1, 2019, 10 pp.

"Federation" The Kubernetes Authors, Mar. 12, 2019, available at https://kubernetes.io/docs/tasks/federation/ (last accessed Aug. 22, 2019) 7 pp.

"Hyper-Converged Kubernetes Architecture: ROBIN—Databases, Big Data" ROBIN, May 28, 2019, available at https://robin.io/product/architecture/ (last accessed Aug. 22, 2019), 4 pp.

"Hyperconverged Kubernetes" White Paper, ROBIN, Jan. 28, 2019, available at https://robin.io/portfolio/hyperconverged-kubernetes-whitepaper/ (last accessed Aug. 22, 2019), 15 pp.

Callahan, "Introducing the Zenko Multi-Cloud Data Controller—Scality" Scality, Jul. 12, 2017, available at https://www.scality.com/introducing-zenko-multi-cloud-data-controller/ (last accessed Aug. 22, 2019), 10 pp.

Rehman et al. "Kubernetes Federation Evolution" The Kubernetes Authors, Dec. 12, 2018, available at https://kubernetes.io/blog/2018/12/12/kubernetes-federation-evolution/ (last accessed Aug. 22, 2019), 8 pp.

Hölzle et al. "Introducing Anthos: An entirely new platform for managing applications in today's multi-cloud world" Google, Inc., Apr. 9, 2019, available at https://cloud.google.com/blog/topics/hybrid-cloud/new-platform-for-managing-applications-in-todays-multi-cloud-world, (last accessed Aug. 22, 2019), 2 pp.

"Marathon Placement Constraints" Mesosphere DC/OS Documentation, Mesosphere, Oct. 25, 2018, available at https://docs.d2iq.com/mesosphere/dcos/1.12/deploying-services/marathon-constraints/ (last accessed Aug. 22, 2019), 2 pp.

"Multi-Cloud" NooBaa, Apr. 28, 2018, available at https://www.noobaa.io/multicloud (last accessed Aug. 22, 2019), 7 pp.

"OpenStack Docs: Placement Usage" The OpenStack Project, Mar. 18, 2019, available at https://docs.openstack.org/placement/latest/usage/index.html (last accessed Aug. 22, 2019), 3 pp.

"OpenStack Docs: Stein Series Release Notes" The OpenStack Project, Apr. 11, 2019, available at https://docs.openstack.org/releasenotes/placement/stein.html# (last accessed Aug. 22, 2019), 4 pp.

"OpenStack Stein—OpenStack is open source software for creating private and public clouds." The OpenStack Project, Apr. 10, 2019, available at https://www.openstack.org/software/stein/ (last accessed Aug. 22, 2019), 34 pp.

"Portworx features & pricing: Container storage, HA, security" The Portworx Platform, Dec. 5, 2018, available at https://portworx.com/products/features/ (last accessed Aug. 22, 2019), 8 pp.

Meyer, "Red Hat Squeezes OpenStack, OpenShift Closer Together" SDxCentral, Nov. 13, 2018, available at https://www.sdxcentral.com/articles/news/red-hat-squeezes-openstack-openshift-closer-together/2018/11/ (last accessed Aug. 22, 2019), 3 pp.

"REX-Ray" REX-Ray, Apr. 23, 2018, available at https://rexray.io (last accessed Aug. 22, 2019), 12 pp.

"Openly serious about storage" REX-Ray, Feb. 28, 2018, available at https://rexray.readthedocs.io/en/stable/ (last accessed Aug. 22, 2019), 5 pp.

"Open-Source, Cloud-Native Storage for Kubernetes" Rook Authors, Jun. 27, 2017, available at https://rook.io (last accessed Aug. 22, 2019), 6 pp.

"Scality RING Multi-Cloud Data Storage at Petabyte Scale" Scality Ring 7.4 Data Sheet, Scality, Jun. 5, 2018, 4 pp.

"What is Multi Cloud?" Scaility, Dec. 2, 2017, available at https://www.scality.com/topics/what-is-multi-cloud/ (last accessed Aug. 22, 2019), 10 pp.

Symantec Corporation: "E-Security begins with sound security policies", Announcement Symantec, Jun. 14, 2001, 23 pp.

U.S. Appl. No. 17/009,631, filed Sep. 1, 2020, naming inventors Miriyala et al.

U.S. Appl. No. 16/947,570, filed Aug. 6, 2020, naming inventors Miriyala et al.

Response to the Extended European Search Report dated Feb. 18, 2020 from counterpart European Application No. 19199139.7, filed Jun. 23, 2021, 14 pp.

\* cited by examiner

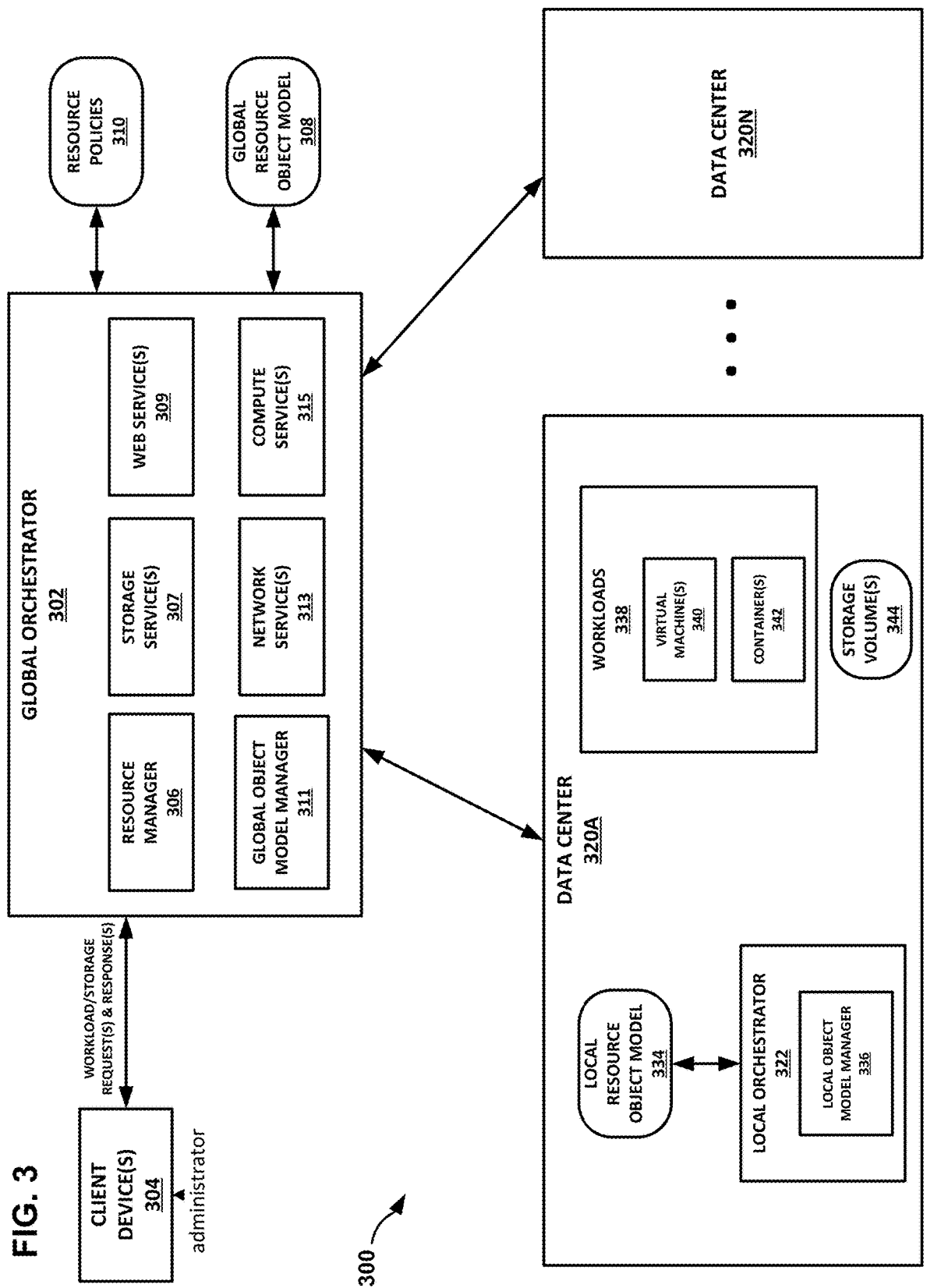

```
policy_name: example_policy
location: France
user_location: "Paris, Renne, Marseilles, Montpellier"
sub-policy: workload_policy policy_name: workload_policy
orchestrator:
  type: container          # Find orchestrator objects that have tag type equal to "container"
  max:
    user_latency: 15       # Find links on orchestrator objects where the tag "user_latency" is less than 15 (ms)
    latency: 20            # Find objects where the tag "storage_latency" is less than 20ms
    cost: -1               # Select the orchestrator object where the tag "cost" has the minimum value
  link:
    direction: from
    object: user_location
    max:
      latency: 50          # Find links from user_location objects that have tag "latency" less than 50 (ms)
storage:
  type: file               # Find storage objects that have a tag "type" equal to "file"
  max:
    cost: -1               # Select the storage object where the tag "cost" has the minimum value
  min:
    performance: 1.5       # Find storage objects where the tag "performance" is greater than 1.5 (Gb/s)
  link:
    direction: from
    object: orchestrator
    max:
      latency: 20          # Find storage objects whose links from orchestrator objects have tag "latency" less than 20 (ms)
```

FIG. 7

USING MULTIDIMENSIONAL METADATA TAG SETS TO DETERMINE RESOURCE ALLOCATION IN A DISTRIBUTED COMPUTING ENVIRONMENT

TECHNICAL FIELD

This disclosure relates to management of resources in computer networks.

BACKGROUND

In a typical data center, a large collection of interconnected servers provides computing and/or storage capacity for execution of various applications. For example, a data center may comprise a facility that hosts applications and services for subscribers or customers of the data center. The data center may, for example, host infrastructure equipment, such as networking and storage systems, redundant power supplies, and environmental controls. In some data centers, clusters of storage systems and application servers are interconnected via a high-speed network fabric provided by one or more tiers of physical network devices, such as switches and routers. Certain sophisticated enterprises and service providers may employ multiple data centers with infrastructure spread throughout the world with subscriber support equipment located in various physical hosting facilities.

Data centers are becoming a core foundation of the modern information technology (IT) infrastructure. In particular, modern data centers have extensively utilized virtualized environments in which virtual hosts, such as virtual machines or containers, are deployed and executed on an underlying compute platform composed of physical computing devices. The data centers included within a distributed computing environment may include local (e.g., on-premises) data centers that are geographically co-located with a client or customer site, as well as third-party remote (e.g., cloud) data centers that are provided by one or more service providers.

Virtual machines are software programs that provide functionality of a physical computer or machine, and which may be configured to execute operating systems and/or applications on one or more data centers of the distributed computing environment. Containerization is a virtualization scheme based, e.g., on operating system-level virtualization. Containers are light-weight and portable execution elements for applications that are isolated from one another and from a host. Because containers are not tightly coupled to the host hardware computing environment, an application can be tied to a container image and executed as a single light-weight package on any host or virtual host that supports the underlying container architecture. As such, containers enable the execution of software in different computing environments within one or more data centers of the distribute computing environment.

SUMMARY

In general, this disclosure describes techniques for using metadata tags to determine resource allocation within a distributed computing system that is distributed among a group of data centers. For example, through the implementation and analysis of metadata tags that are assigned to objects in a resource object model that is associated with resources in the distributed computing system, a global orchestrator is configured to select a particular data center for allocating one or more virtual compute and/or storage resources (e.g., compute nodes, virtual machines, containers, or storage volumes) that may be used by applications executing within the distributed computing system.

Upon receiving a resource request from an administrator or enterprise user for a virtual compute or storage resource (e.g., virtual machine, container, or storage volume), the global orchestrator may identify a resource policy associated with the request, where the policy includes rules that each specifies metadata tags and associated criteria. The global orchestrator may then identify which objects within the resource object model have assigned tag values that satisfy the criteria specified in the policy to select a particular data center in the distributed system, such that the computing infrastructure in the selected data center may provide or allocate the requested compute or storage resource in response to the resource request. As a result, the global orchestrator may, over time, enable the automated management and optimization of virtualized compute and/or storage resource placement and allocation across multiple different data centers for the distributed system, when conformance to various rules or policies (e.g., country location and/or latency between workload and storage resources) are to be met.

In one example, a method includes receiving, by an orchestrator executed by one or more processors, a resource request for at least one compute or storage resource from a distributed computing system distributed among multiple data centers, determining, by the orchestrator, a resource policy that is associated with the resource request, wherein the resource policy includes a rule specifying at least one metadata tag and at least one criterion associated with the at least one metadata tag, and identifying, by the orchestrator, at least one object included in a resource object model that complies with the rule of the resource policy, wherein the at least one object has an assigned value for the metadata tag that satisfies the at least one criterion, and wherein the resource object model includes one or more objects for respective resources in each of the multiple data centers. The example method further includes selecting, by the orchestrator, a data center of the distributed computing system that is associated with the at least one object identified from the resource object model, and deploying, by the orchestrator and on the selected data center, the at least one compute or storage resource in response to the resource request.

In another example, a computing system includes one or more processors and at least one computer-readable storage medium. The at least one computer-readable storage medium stores instructions that, when executed, cause the one or more processors to: receive a resource request for at least one compute or storage resource from a distributed computing system distributed among multiple data centers; determine a resource policy that is associated with the resource request, wherein the resource policy includes a rule specifying at least one metadata tag and at least one criterion associated with the at least one metadata tag; identify at least one object included in a resource object model that complies with the rule of the resource policy, wherein the at least one object has an assigned value for the metadata tag that satisfies the at least one criterion, and wherein the resource object model includes one or more objects for respective resources in each of the multiple data centers; select a data center of the distributed computing system that is associated with the at least one object identified from the resource object model; and deploy, on the selected data center, the at least one compute or storage resource in response to the resource request.

In another example, a computer-readable storage medium stores instructions that are executable by at least one processor to: receive a resource request for at least one compute or storage resource from a distributed computing system distributed among multiple data centers; determine a resource policy that is associated with the resource request, wherein the resource policy includes a rule specifying at least one metadata tag and at least one criterion associated with the at least one metadata tag; identify at least one object included in a resource object model that complies with the rule of the resource policy, wherein the at least one object has an assigned value for the metadata tag that satisfies the at least one criterion, and wherein the resource object model includes one or more objects for respective resources in each of the multiple data centers; select a data center of the distributed computing system that is associated with the at least one object identified from the resource object model; and deploy, on the selected data center, the at least one compute or storage resource in response to the resource request.

The details of one or more examples are set forth in the accompanying drawings and the description below. Other features, objects, and advantages will be apparent from the description and drawings, and from the claims.

BRIEF DESCRIPTION OF DRAWINGS

FIG. 3 is a block diagram illustrating further example details of the distributed computing system shown in FIG. 1, in accordance with one or more techniques of the present disclosure.

FIG. 7 is a diagram illustrating another example resource policy, in accordance with one or more techniques of the present disclosure.

DETAILED DESCRIPTION

Figure 1:
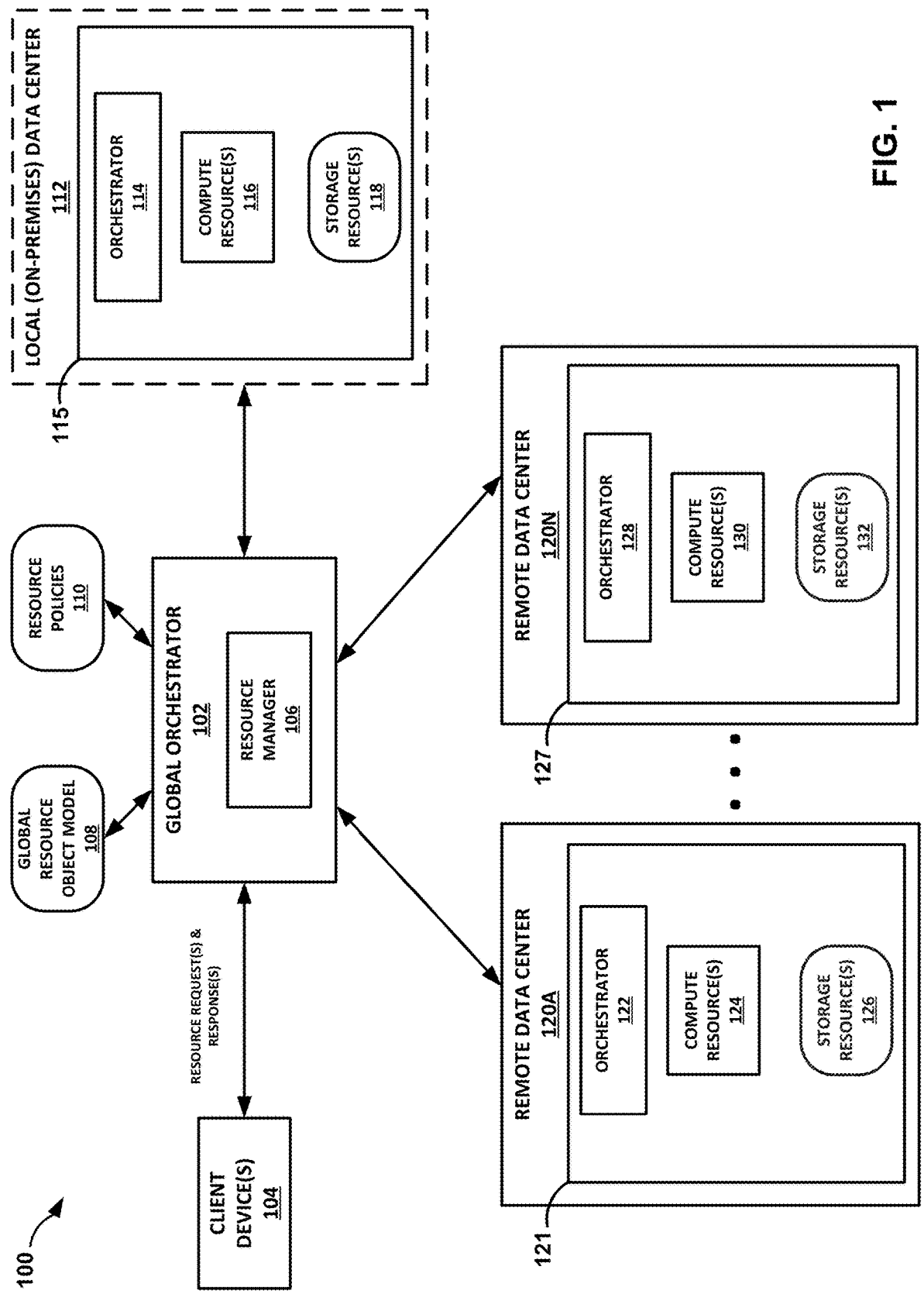
FIG. 1 is a block diagram illustrating an example distributed computing system in which a global orchestrator selects one or more data centers for allocating compute and/or storage resources, in accordance with one or more techniques of the present disclosure.

As noted above, data centers are becoming a core foundation of the modern information technology (IT) infrastructure. In some data centers, a large collection of interconnected computing devices (e.g., real or virtual servers) may provide computing and/or storage capacity for execution of various applications. For instance, a data center may comprise a facility that hosts applications and services for customers of the data center, which may comprise a local or remote data center. Modern data centers have extensively utilized virtualized environments in which virtual hosts, such virtual machines or containers, are deployed and executed on an underlying compute platform composed of physical computing devices. As used herein, the term data center may refer to physical location(s) or frameworks for the data center, and/or the computing infrastructure that is included in or otherwise provided by the data center.

The data centers included within a distributed computing system may include local (e.g., on-premises) data centers that are geographically co-located with a client or customer site, as well as third-party remote (e.g., cloud) data centers that are provided by one or more service providers. Enterprises that implement or execute applications within a distributed computing system often have choices as to whether to instantiate application workloads, such as virtual machines or containers, such as within one of their own private, local data centers and/or in a public, remote data center operated by third-party service provider. Each individual data center may comprise computing devices or servers that are geographically co-located, in one geographic location, or that are dispersed across multiple different locations. Each data center may include systems that execute or otherwise implement virtualized workloads and/or provide storage for applications.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical processing unit, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise staff often prefer virtualized compute clusters in data centers for their management advantages in addition to the efficiency and increased return on investment that virtualization provides.

Virtual machines are software programs that provide functionality of a physical computer or machine, and which may be configured to execute operating systems and/or applications. Containerization is a virtualization scheme based on operating system-level virtualization. Containers are light-weight and portable execution elements for applications that are isolated from one another and from the host. With containers' inherently lightweight nature, a single host can often support many more container instances than traditional virtual machines (VMs). Often short-lived, containers can be managed as groups of logically related elements (sometimes referred to as "pods" for some orchestration platforms, e.g., Kubernetes). The container network may be agnostic to work with the multiple types of orchestration platforms that are used to deploy containerized applications. One or more storage volumes may be attached and/or detached from one or more containers at any point in time, and may serve to provide virtualized storage elements for use during execution of applications within these containers.

According to the techniques of the present disclosure, a global orchestrator (e.g., comprising one or more virtual machines or containers) may maintain a resource object model that is associated with a distributed computing system having multiple data centers, where the object model may, in some cases, represent locations and links between locations or other objects within the resource object model. Each object in the resource object model may be associated with a physical or virtual resource of the distributed computing system and/or data centers. For example, objects may represent locations, storage volumes, links, endpoints, orchestrators, or workloads (e.g., virtual machines or containers). Metadata tags (e.g., numeric or alphanumeric tags) are associated with these objects to indicate properties or other characteristics of the resources or entities that are represented by the corresponding objects (e.g., properties of location objects and links between them). For instance, an orchestrator object could be tagged to indicate which type of orchestrator it is (e.g., virtual machine or container) and its location, and a storage volume object could have a tag to indicate its type (e.g. file, block, object). A link object between locations could have a tag to indicate the latency between locations or sites. Cost tags may be applied to objects to indicate or represent actual billing and/or internal costs associated with these objects.

Upon receiving a resource request from an administrator or enterprise user for a virtual compute or storage resource, the global orchestrator may identify a resource policy associated with the request, where the policy includes rules that each specify tags and associated criteria. The global orchestrator may then identify which objects within the resource object model have assigned tag values that satisfy the criteria specified in the policy to select a particular data center in the distributed system that may provide or allocate the requested compute or storage resource in response to the resource request. For instance, a policy may indicate that a requested workload (e.g., container or virtual machine), along with corresponding storage, are to be created in a data center located in France, and that the latency between the workload and the storage is to be less than 10 ms. The global orchestrator can use the tags in its object model to calculate which locations will meet the policy requirements and then instruct the orchestrators and/or storage management system in the selected locations to create the workload and its storage.

As a result, the global orchestrator may, over time, enable the automated management and optimization of virtualized compute and/or storage resource placement and allocation across multiple different data centers in the distributed system, when conformance to various rules or policies, such as country location and latency between workload and storage, are to be met. In some cases, the global orchestrator may communicate with local orchestrators associated with respective data centers in the distributed system when building and maintaining the object model that is used when analyzing the metadata tags and identifying the data centers at which virtualized resources will be allocated.

FIG. 1 is a block diagram illustrating an example distributed computing system 100 in which a global orchestrator 102 selects one or more data centers for allocating compute and/or storage resources, in accordance with one or more techniques of the present disclosure. As illustrated in FIG. 1, these data centers may include one or more remote cloud data centers 120A-120N (collectively, "remote data centers 120") that are remote from the customer or client site and that are provided and/or maintained by one or more respective service providers. Thus, remote data centers 120 may be geographically remote from the customer or client site (and remote from one or more client devices 104 if these devices are located at the customer or client site). System 100 may, in certain cases, also include a local, on-premises data center 112, which may be local to the customer or client site (e.g., geographically co-located with the customer or client device, and with client devices 104 if these devices are located at the customer or client site). Remote data centers 120 may be operated by one or more service providers. For example, remote data center 120A may be provided and/maintained by one particular third-party service provider (e.g., service provider "A"), and data center 120N may be provided and/or maintained by a different third-party service provider (e.g., service provider "N"). Each one of remote data centers 120 may be physically located at one geographical location or distributed among different geographical locations. Remote data centers 120 may include leased computing infrastructure or virtualized computing infrastructure for tenants hosting applications.

In general, one or more of data centers 112 and/or 120 may include a computing infrastructure that provides an operating environment for applications and services for computing devices (e.g., nodes) that are included in or coupled to the respective data center. One or more of data centers 112 and/or 120 may, for example, host infrastructure equipment, such as networking and storage systems, redundant power supplies, and environmental controls. In some examples, service provider network(s) that couple nodes to one or more of data centers 120 may be coupled to one or more networks administered by other providers and may thus form part of a large-scale public network infrastructure, e.g., the Internet. Data centers 112 and/or 120 may therefore be interconnected by a wide area network (WAN) (not shown in FIG. 1), and the network communication path between each pair of data centers 112 and 120 has a particular network latency associated with it. For example, the network communication path between data center 120A and 120B may have a particular network latency (in each direction), and the network communication path between data center 120A and 112 may have a particular network latency (in each direction).

In some examples, data centers 120 may each represent one or more geographically distributed network data centers. In certain cases, any one of data centers 120 may be located in one geographical location, or distributed across multiple locations. Data centers 120 may be facilities that provide services for customer devices (e.g., client devices 104), which may be, e.g., devices of entities such as enterprises and governments or individuals. For example, a data center may host web services for several enterprises and end users. Other example services may include data storage, virtual private networks, traffic engineering, file service, data mining, scientific- or super-computing, and so on. In some cases, data centers 112 and/or 120 may include individual network servers, network peers, or otherwise. Data centers 112 and/or 120 may provide Infrastructure as a Service (IaaS), Platform as a Service (PaaS), Software as a Service (SaaS), or other/anything as a Service (XaaS).

In various examples, one or more of data centers 112 and/or 120 may each include a set of storage systems and application servers interconnected via a switching fabric, which may comprise a fabric provided by one or more tiers of physical network devices, such as, for example, routers, gateways, switches, hubs, modems, bridges, repeaters, multiplexers, servers, virtual machines running on one or more of the same, and other example network devices. In certain examples, the switching fabric may include three tiers of devices: one or more spine devices, one or more aggregation devices, and one or more leaf devices. Other topologies may be used in other examples. The servers may provide execution and storage environments for applications and data associated with customer devices and may be physical/real servers, virtual machines or combinations thereof.

As noted above, data center 112 may be an on-premises or on-site data center, which is local to client devices 104 and may constitute a private data center. Remote data centers 120 may be public cloud data centers, which are remote from client devices 104. Each of data centers 112 and/or 120 may include or otherwise be communicatively coupled to one or more nodes, such as control nodes, storage element nodes, compute nodes, network nodes, and the like. For instance, as shown in FIG. 1, data center 112 includes one or more nodes 115, data center 120A includes one or more nodes 121, and data center 120N includes one or more nodes 127, as described in further detail below. Each of these nodes may comprise one or more physical, virtual devices, or other entities, such as one or more computing devices, server devices, real servers, virtual servers, storage devices/systems, client devices, virtual machines, or the like. Global orchestrator 102 may be implemented or executed on one or more computing devices, such as any of the nodes in system 100. Global orchestrator 102 may be located in one of data centers 112, 120, or another data center. For example, node 115, 121, or 127 may include global orchestrator 102, which may itself be a workload, container, or one or more separate computing nodes each executing one or more of components of global orchestrator 102.

As illustrated in FIG. 1, the nodes of data centers 112, 120 include various corresponding resources. For example, one or more nodes 115 of local data center 112 include one or more compute resources 116 and one or more storage resources 118. Compute resources 116 may provide compute functionality for applications executing within distributed computing system 100, and they may include physical and/or virtual workload resources (e.g., bare metal servers, virtual machines, containers). Storage resources 118 may include physical and/or virtual storage resources provided by data center 112 that may be used with compute resources 116 during application execution. Nodes 115 of data center 112 may also execute a local orchestrator 114. In some cases, local orchestrator 114 may run as one or more virtual resources such as virtual machines or containers implemented by compute resources 116. Local orchestrator 114 may provide functions similar to that of global orchestrator 102 but localized in scope within data center 112.

Similarly, each of remote data centers 120 may also include corresponding local orchestrators, compute resources, and storage resources. As illustrated in FIG. 1, one or more nodes 121 of data center 120A include orchestrator 122, one or more compute resources 124, and one or more storage resources 126. One or more nodes 127 of data center 120N include orchestrator 128, one or more compute resources 130, and one or more storage resources 132.

An automation platform may automate deployment, scaling, and operations of compute and storage resources across data centers 112, 120 to provide virtualized infrastructure for executing application workloads and services. In some examples, the platform may be a container and/or storage volume orchestration platform that provides a container-centric and/or storage volume-centric infrastructure for automating deployment, scaling, and operations of virtual machines, containers and/or storage volumes. Orchestration, in the context of a virtualized computing infrastructure generally refers to deployment, provisioning, scheduling, and/or management of virtual execution elements and/or applications and services executing on such virtual execution elements with respect to the compute and storage resources available to the orchestration platform, which are provided by data centers 112, 120. Example instances of orchestration platforms include Kubernetes, Docker swarm, Mesos/Marathon, OpenShift, OpenStack, VMware, and Amazon ECS. Deployment, as used herein, generally refers to instantiating real or virtual execution elements for use, e.g., by a tenant or client.

"Container-based" or "operating system" virtualization refers to the virtualization of an operating system to run multiple isolated systems on a single machine (virtual or physical). Like a virtual machine, each container is virtualized and may remain isolated from the host machine and other containers. However, unlike a virtual machine, each container may omit an individual operating system and provide only an application suite and application-specific libraries. In general, a container is executed by a host node as an isolated user-space instance and may share an operating system and common libraries with other containers executing on the host machine. Thus, containers may, in some cases, have less processing power, storage, and network resources than virtual machines. A group of one or more containers may be configured to share one or more virtual network interfaces for communicating on corresponding virtual networks. In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems.

Global orchestrator 102 may, in some cases, store configuration data for containers, which may, e.g., include network configuration data for a container, such as a port, bridge, Media Access Control (MAC) address, Internet Protocol (IP) address, other unique identifier, gateway, Domain Name Service (DNS) services, and Dynamic Host Configuration Protocol (DHCP) lease information and/or settings for obtaining an IP address for the container. The type of network a container uses may be transparent from within the container. The configuration data may include storage volume data, such as an identifier, location, or other information usable for attaching the storage volume to a container.

Client device 104 may be a customer device that executes a browser-based or other graphical user interface client for one or more web or command-line interface applications. According to certain techniques of the present disclosure, a resource manager 106 of global orchestrator 102 may analyze metadata tags that are assigned to resource objects with a global resource object model 108 to determine virtual resource allocation within distributed computing system 100. For example, through the implementation and analysis of metadata tags that are assigned to objects in global resource object model 108, which is associated with system 100, global orchestrator 102 may utilize resource manager 106 to select a particular data center (e.g., one of data centers 112, 120) for deploying one or more virtual compute and/or storage resources, such as compute nodes, virtual machines, containers, or storage volumes, which may be used by applications that are executing within system 100. Certain details of example uses of tags are described in U.S. application Ser. No. 15/819,522, filed Nov. 21, 2017 and entitled "SCALABLE POLICY MANAGEMENT FOR VIRTUAL NETWORKS," which is incorporated herein by reference in its entirety.

Figure 8:
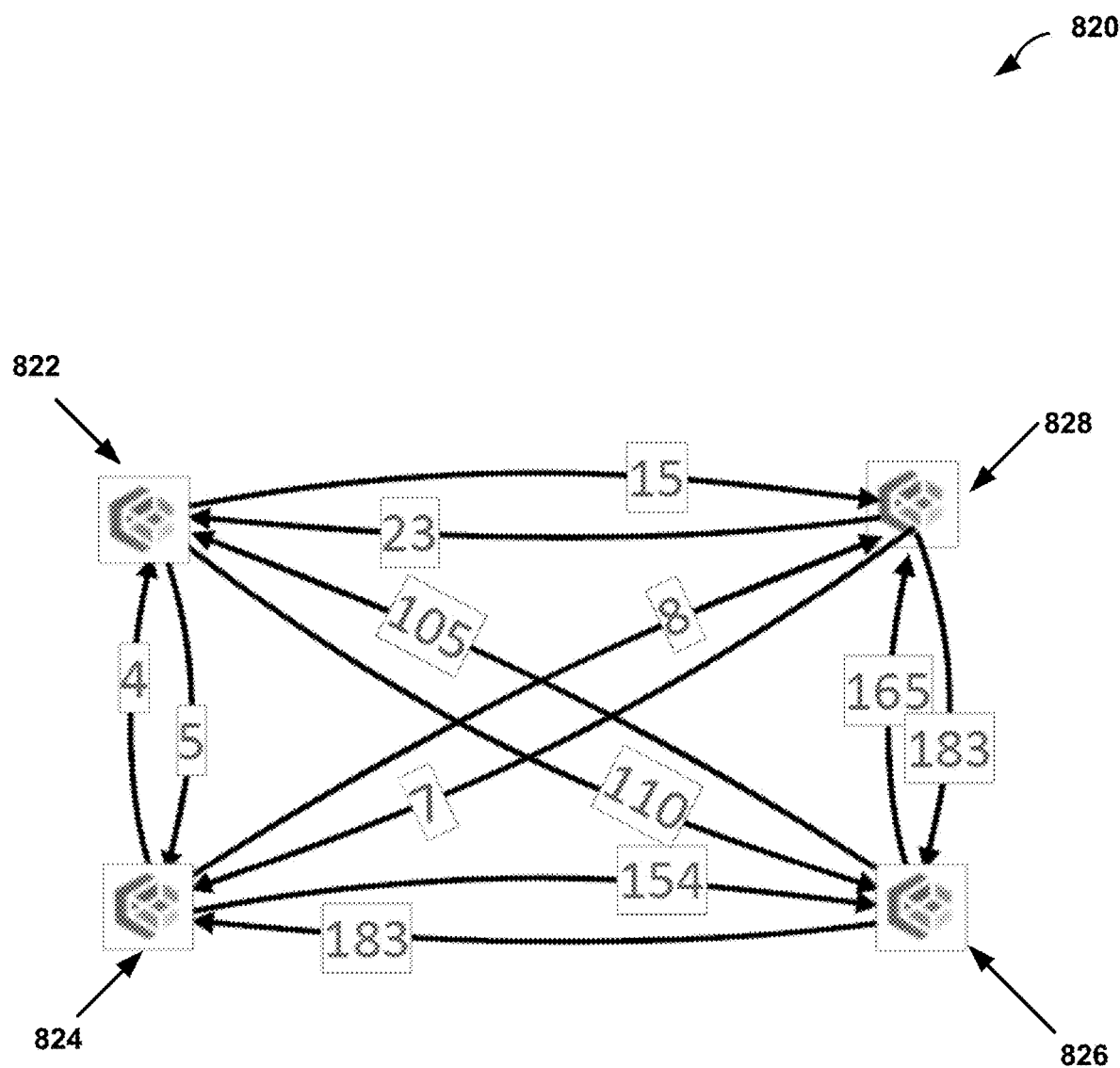
FIG. 8 is a conceptual diagram illustrating an example of latency tag values for a resource object model, in accordance with one or more techniques of the present disclosure.

Global orchestrator 102 may maintain global resource object model 108. Each object in global resource object model 108 may be associated with a physical or virtual resource, or related entity, of system 100, including data centers 112, 120. For example, objects may represent data centers located at locations, storage volumes, links, endpoints, orchestrators, or workloads (e.g., virtual machines or containers). Metadata tags are associated with these objects to indicate properties or other characteristics of the resources or entities that are represented by the corresponding objects. For instance, an orchestrator object could be tagged to indicate which type of orchestrator it is (e.g., virtual machine or container) and its location, and a storage volume object could have a tag to indicate its type (e.g. file, block, object). A link object between locations could have a tag (e.g, latency tag) to indicate the latency between locations or sites. For example, a latency tag can indicate network latency between data center sites or from data center sites to locations of users or other end-points. Link latency tags can be auto-generated by one or more network controller (e.g., such as shown in FIG. 8). Cost tags may be applied to objects to indicate or represent actual billing and/or internal costs associated with these objects. Global orchestrator 102 and/or local orchestrators of corresponding data centers (e.g., orchestrator 114 of data center 112, orchestrator 122 of data center 120A, orchestrator 128 of data center 120N) may assign these tags to corresponding objects, either automatically or via user input (e.g., user input via client devices 104).

Upon receiving a resource request from an administrator or enterprise user for a compute or storage resource (e.g., virtual or software-defined resource), such as, e.g., via one or more client devices 104, resource manager 106 of global orchestrator 102 may determine a resource policy from resource policies 110 associated with the request. This policy includes rules that each specify metadata tags and associated criteria. Global orchestrator 102 may then identify which objects within global resource object model 108 have assigned tag values that satisfy the criteria specified in the rules of a policy, thereby complying with a particular policy, in order to select a particular data center in system 100 that may provide or allocate the requested compute or storage resource in response to the resource request. Global resource object model 108 may include one or more objects for respective resources in each of the multiple data centers 112, 120.

For example, global orchestrator 102 may identify one of local data center 112, remote data center 120A, or remote data center 120N, which is associated with the object(s) from global resource object model 108. Global orchestrator 102 may then deploy, on the selected data center, the one or more compute or storage resources (e.g., compute resources 116 and/or storage resources 118 of data center 112, compute resources 124 and/or storage resources 126 of data center 120A, compute resources 130 and/or storage resources 132 of data center 120N) (e.g., for use by client devices 104) in response to the resource request. For instance, global orchestrator 102 may send, to the local orchestrator of the selected data center (e.g., orchestrator 122 of data center 120A, orchestrator 128 of data center 120N), a request to allocate the one or more compute or storage resources (e.g., for use by client devices 104). Global orchestrator 102 may then update resource object model 108 to add at least one new object for the at least one deployed compute or storage resource. This at least one new object is associated with the selected data center within resource object model 108.

As described previously, orchestration generally refers to deployment, provisioning, scheduling, and/or management of virtual or software-defined compute and/or storage resources available to the orchestration platform, which are provided by data centers 112, 120. In certain cases, the orchestration platform in which global orchestrator 102 executes (e.g., Kubernetes platform), the scheduler of such platform, using resource manager 106, may act upon the metadata tag information included in object model 108, in conjunction with resource policies, to determine resource (e.g., workload, storage volume) placement and/or deployment decisions on data centers 112, 120. If the orchestration platform is a Kubernetes platform, in certain examples, this functionality may be achieved by adding customized resource definitions into the Kubernetes environment in order to modify network routing decisions, selection of compute and/or storage device class, and physical location placement of containers and/or storage workloads across the distributed computing environment of system 100, which includes data centers 112, 120. The customized resource definitions may be associated with data centers 112, 120 and/or associated compute and storage resources. In other examples, an extension to the Kubernetes scheduler may be implemented to modify its bin packing algorithm to provide such functionality.

In some examples, global orchestrator 102 may assign the corresponding assigned values of one or more of the metadata tags of objects included in resource object model 108, such as initially when objects are first added to resource object model 108, or later when global orchestrator 102 updates these values for objects that are already included in resource object model 108. Global orchestrator 102 may assign and/or update the assigned values of the metadata tags for objects at any point in time based on one or more an automatic analysis of one or more of more data centers 112, 120 included in system 100, or on input(s) received from client device 104.

For instance, in various examples, global orchestrator 102 may either individually or in conjunction with one or more orchestrators of data centers 112, 120 (e.g., orchestrator 114, 122, and/or 128) perform an automatic analysis and determine various characteristics of these data centers (e.g., geographic location/region characteristics, latency characteristics, cost characteristics, provider characteristics, compute/storage class characteristics). Global orchestrator 102 may then assign or update the values of metadata tags associated with these characteristics for corresponding objects in resource object model 108, as described in further detail below. In various cases, latency characteristics may include network and/or storage latency characteristics that each include one or more lower-level metrics. Storage latency characteristics may be associated with the response time of storage resources, while network latency characteristics may be associated with the response time of the networks and/or links used to reach compute and/or storage resources. (FIG. 8 also illustrates one example of an automatic determination of latency tag values for corresponding objects in an object model such as resource object model 108.)

In certain other cases, global orchestrator 102 may assign and/or update the assigned values of the metadata tags for objects based on input(s) received from client device 104. For example, an administrator using client device 104 may provide user input specifying certain cost values that are to be assigned to one or more of compute resources 124 and/or storage resources 126 of data center 120A. Global orchestrator 102 may receive these cost values from client device 104 and identify objects within resource object model 108 that are associated with these compute resources 124 and/or storage resources 126 of data center 120A. Global orchestrator 102 may then assign or update the values of the metadata cost tags for these particular objects.

Figures 6A, 6B, 6C:
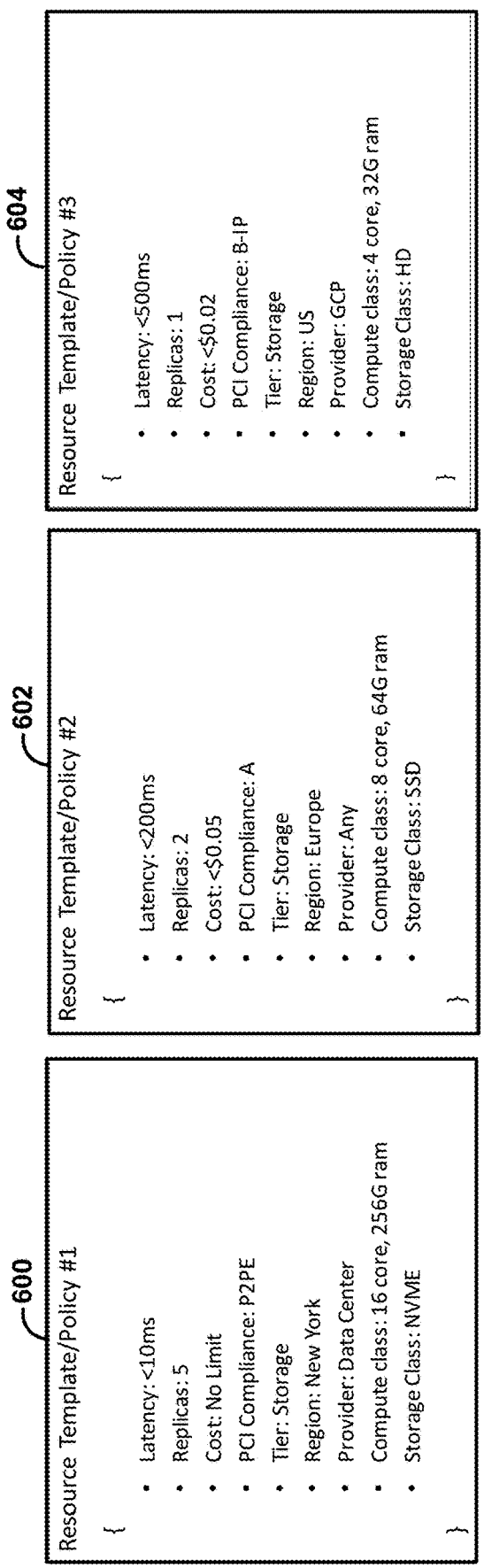
FIGS. 6A-6C are diagrams illustrating examples of resource policies, or templates, which may be used within a distributed computing system, in accordance with one or more techniques of the present disclosure.

In certain examples, global orchestrator 102 may determine the particular resource policy of resource policies 110 that is associated with an incoming resource request from client device 104 based on at least one of a location of client device 104, a type of application associated with the resource request, a type of the at least one compute or storage resource indicated by the resource request, or a quantity of at least one compute or storage resource indicated by the resource request, as further described in reference to FIGS. 6A-6C.

For example, global orchestrator 102 may determine the particular resource policy based on the geographic location of client device 104. In another example, global orchestrator 102 may determine the particular resource policy based on a type of application associated with the resource request. If, for example, the application is a database application, global orchestrator 102 may identify a resource policy having rules that are tailored or optimized for database operations within system 100. However, if the application is a streaming audio application, global orchestrator 102 may identify a different resource policy from resource policies 110 having rules that are suitable or optimized for streaming audio operations or applications within system 100. In some cases, global orchestrator 102 may determine the particular resource policy from resource policies 110 based on a type of the at least one compute or storage resource indicated by the resource request (e.g., container or storage volume), or a quantity of at least one compute or storage resource indicated by the resource request.

As a result, global orchestrator 102 may, over time, enable the automated management and optimization of virtualized compute and/or storage resource placement and allocation across multiple different data centers in system 100, when conformance to various rules or policies (e.g., country location and latency between workload and storage) are to be met. One or more of global orchestrator 102, local orchestrator 114, local orchestrator 122, and/or local orchestrator 128 may be implemented as software-defined controllers. In some cases, global orchestrator 102 may communicate with local orchestrators 114, 122, and/or 128 associated with respective data centers 112, 120A, and 120N in system 100 (e.g., via application programming interfaces exposes by these orchestrators) when building and maintaining global resource object model 108 that is used when analyzing the metadata tags and identifying which data centers at which virtualized and/or software-defined resources will be allocated and deployed. In certain examples, such as examples in which the orchestration platform is a Kubernetes platform, the metadata tags may be published back to the Kubernetes platform as a mechanism of influencing scheduling or routing decisions, selection of compute and/or storage device class, and physical location placement of containers and/or storage workloads across the distributed computing environment of system 100.

Figure 2:
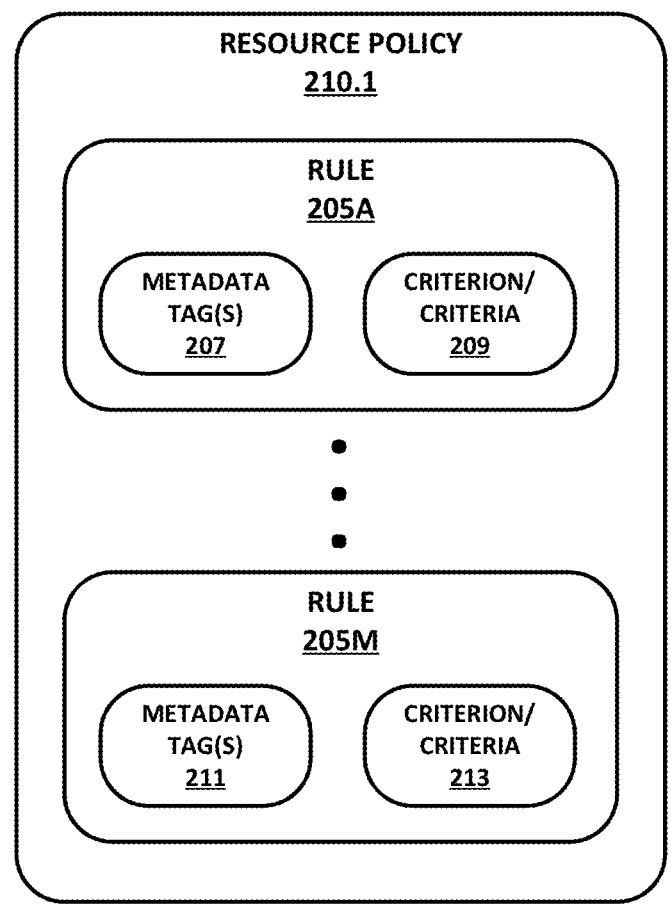
FIG. 2 is a block diagram illustrating further example details of one of the resource policies shown in FIG. 1, in accordance with one or more techniques of the present disclosure.

FIG. 2 is a block diagram illustrating further example details of one of the resource policies shown in FIG. 1, in accordance with one or more techniques of the present disclosure. In FIG. 2, resource policy 210.1 may be an example of one of the policies includes in resources policies 110 of FIG. 1. As described above in reference to FIG. 1, resource manager 106 of global orchestrator 102 may determine a resource policy from resource policies 110 associated with a request received from client devices 104. This policy includes rules that each specify metadata tags and associated criteria. Global orchestrator 102 may then identify which objects within global resource object model 108 have assigned tag values that satisfy the criteria specified in the policy, thereby complying with a particular policy rule, in order to select a particular data center in system 100 that may provide or allocate the requested compute or storage resource in response to the resource request. Resource policy 210.1, as illustrated in FIG. 2, may be one example of such a policy.

In the example of FIG. 2, resource policy 210.1 includes one or more rules 205A-205M (collectively, "rules 205"). Each of the rules 205 includes or otherwise specifies one or more metadata tags, and one or more associated criteria. For example, rule 205A includes one or more metadata tags 207, and one or more associated criteria 209. Rule 205M includes one or more metadata tags 211, and one or more associated criteria 213. Global orchestrator 102 may use resource policy 210.1, including rules 205, to identify which objects within global resource object model 108 have assigned tag values that satisfy the criteria specified in resource policy 210.1, thereby complying with that particular policy.

For instance, metadata tags 207 of rule 205A may include a particular tag named "location." Criterion 209 of rules 205A may specify that the tag named "location" must have a value of "California." In this example, global orchestrator 102 may identify which objects in global resource object model 108 include the tag named "location," and that further have a value for this tag of "California," thereby satisfying criterion 209 and complying with rule 205A. A location can refer to a region, country, state/province, metropolitan area, city, or area within any of the above. A location may refer to a particular data center or group of data centers. Any such objects may be associated with an orchestrator, a compute resource, and/or a storage resource included in one of data centers 112 or 120. As one example, data center 120A may be physically located in the state of California. In this case, any objects that are included in global resource object model 108, and which are associated with any resources of data center 120A (e.g., one or more objects associated with orchestrator 122, compute resources 124, and/or storage resources 126), may include a metadata tag named "location" that has a value of "California." (Examples of global resource object model 108 are further described below, and also shown in FIG. 5.)

In this case, global orchestrator 102 may identify any such objects that are associated with resources of data center 120A based on rule 205A of resource policy 210.1, given that these objects have an assigned value of "California" for the metadata tag named "location," thereby satisfying criterion 209 of rule 205A. Global orchestrator 102 may then identify data center 120A as the particular data center associated with these identified objects from global resource object model 108, and deploy, on data center 120A, the requested compute or storage resources for use by client devices 104 in response to the resource request.

In some examples, a group of metadata tags 207 and/or metadata tags 211 may comprise multidimensional tags, where the corresponding one or more criteria 209 or 213 are associated with these multidimensional tags. The tags may be referred to as multidimensional tags in these examples due to their representation of various different attributes or characteristics. For instance, metadata tags 207 may include a first tag named "location" and a second tag named "cost." Metadata tags 207 may include one or more "latency" tags for, e.g., network latency and/or storage latency characteristics. In this case, metadata tags 207 may comprise multidimensional tags that represent the various dimensions of location, latency, and cost. Criteria 209 are associated with these tags 207 and may be specify certain conditions that are to be satisfied for rules 205A with respect to certain parameters of location, latency, and/or cost.

Criteria 209 and/or 213 may, in certain examples, include at least one of a maximum threshold criterion, a minimum threshold criterion, or an equality criterion for at least one assigned value of at least one corresponding metadata tag 207 and/or 211. For example, if one of metadata tags 207 includes a latency tag (e.g., a tag named "latency"), criteria 209 may include a criterion specifying a maximum threshold cost value or a minimum threshold cost value for this tag that must be achieved in order to satisfy the criterion. If another one of metadata tags 207 includes a location tag (e.g., a tag named "location"), criteria 209 may include a criterion specifying that this tag have a value that is equal to "California" in order to satisfy the criterion.

FIG. 3 is a block diagram illustrating further example details of the distributed computing system 100 shown in FIG. 1, in accordance with one or more techniques of the present disclosure, where system 300 is one example of system 100. In FIG. 3, elements having similar numbers to those in FIG. 1 may provide similar functionality. For instance, client devices 304 may be one example of client devices 104 shown in FIG. 1. Similarly, global orchestrator 302 may be one example of global orchestrator 102; resource policies 310 may be one example of resource policies 110; global resource object model 308 may be one example of global resource object model 108; data center 320A may be one example of data center 120A; data center 320N may be one example of data center 120N. Although not shown in FIG. 3, system 300 may also include a local, on-premises data center, such as data center 112 shown in FIG. 1.

As shown in FIG. 3, global orchestrator 302 includes resource manager 306, one or more storage services 307, one or more web services 309, global object model manager 311, one or more network services 313, and one or more compute services. Resource manager 306 may be one example of resource manager 106 shown in FIG. 1, which manages resources and resource requests within system 300 using resource policies 310 and resource object model 308, such as described above in reference to FIG. 1. Each of the services or applications provided by global orchestrator 102 may be implemented or executed in one or more application containers or virtual machines (e.g., workloads) that are deployed by global orchestrator 302 on one or more of data centers 320A-320N (collectively, "data centers 320"), such as in workloads 338 of data center 320A illustrated in FIG. 3, which includes one or more virtual machines 340 and one or more containers 342.

Web services 309 may include or more web applications having interfaces presented on client devices 304, including applications that provide graphical user interface functionality. Web services 309 may include a web server that serves web pages to browsers of client devices 304. Compute services 315 may provide various compute and processing functionality in system 300. For example, compute services 315 may facilitate high-availability, resiliency, and horizontal scaling of compute resources in system 300.

Network services 313 may include networking and network management services to system 300. For example, network services 313 may represent a software-defined networking solution for container that can run multiple virtual networks, e.g., VLANs. Network services 313 may facilitate, for instance, support for inter- and intra-node (multi-cloud) communication over the network for containers, isolation of container and application traffic from other traffic coming from any other virtual network or host, elimination of overlapping ports in applications, generation of any number of container instances and the ability to let the instances all listen on the same port, such that clients may avoid having to perform port discovery, running applications that require intra-cluster connectivity, and/or creation of multiple virtual networks to isolate different portions of the computing infrastructure and/or organization.

Storage services 307 may provide storage management functionality in system 300. Storage services 307, in some examples, be implemented or executed in one or more application containers. Storage services 307 may provide a persistent data storage layer that is virtually positioned over data centers 320. Through implementation of storage services 307, client devices 304 and global orchestrator 302 may obtain access to data centers 320 and corresponding data via this persistent data storage layer. Rather than directly accessing data that is stored on data centers 320, client devices 304 and global orchestrator 302 may access virtual data, referred to as storage volumes, which are associated with data stored directly on storage device resources within data centers 320 (e.g., storage volumes 344 of data center 320A). These storage volumes may be attached to individual application containers, which may then access any attached storage volumes for data read and/or write operations for application data that is associated with the respective storage volumes. Storage volumes may be associated with an amount of virtual, collective storage data provided by data centers 320.

Additional details of the operation of storage services 307 are described in U.S. application Ser. No. 16/355,289, filed Mar. 15, 2019 and entitled "STORAGE VOLUME REPLICATION ACROSS MULTIPLE DATA CENTERS," which is incorporated herein by reference in its entirety. An example of a container-centric cloud computing environment with description of virtual networks, orchestration, and software-defined networking is found in U.S. application Ser. No. 16/118,107, filed Aug. 30, 2018 and entitled "MULTIPLE VIRTUAL NETWORK INTERFACE SUPPORT FOR VIRTUAL EXECUTION ELEMENTS," which is incorporated herein by reference in its entirety.

Figure 5:
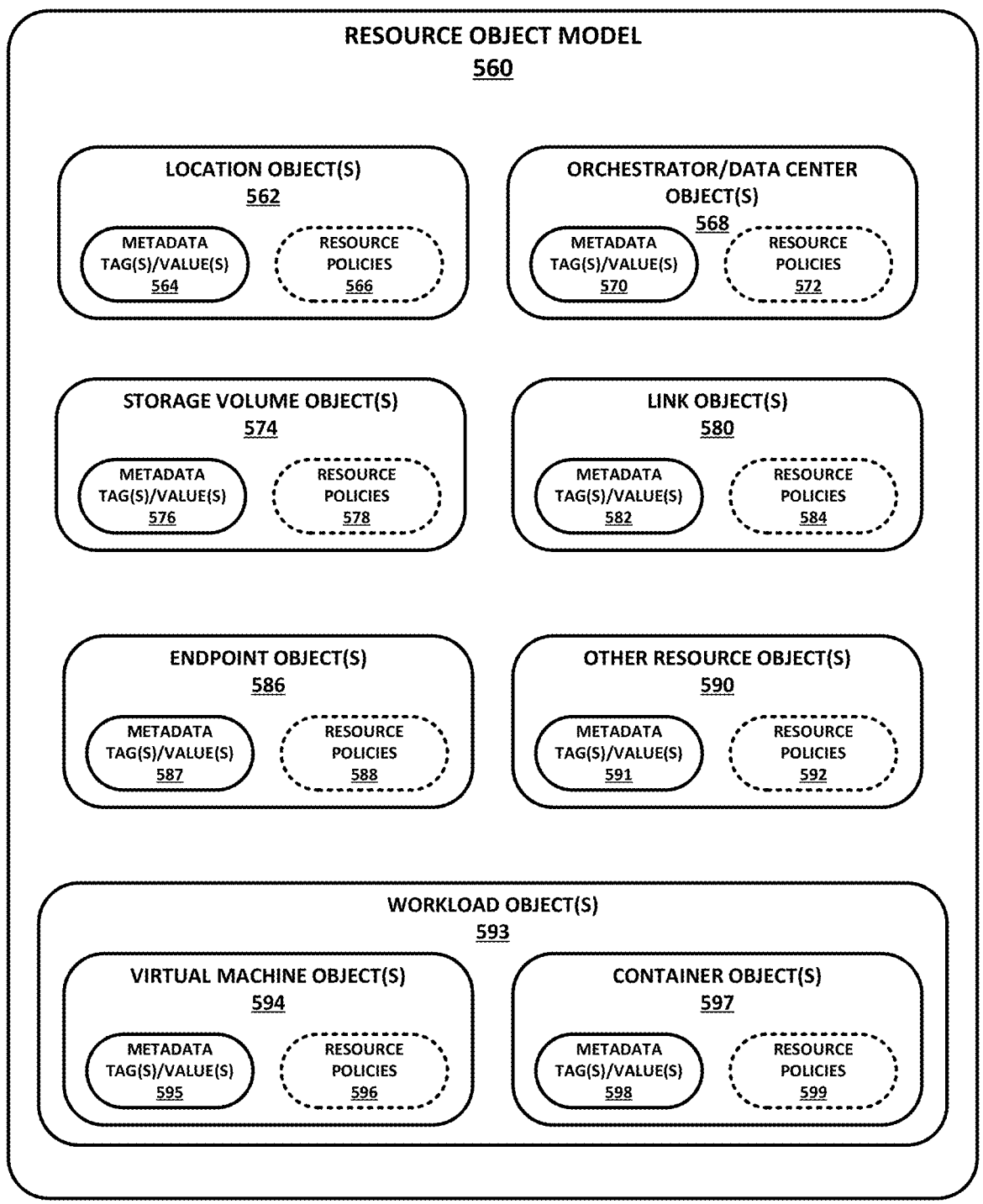
FIG. 5 is a block diagram illustrating an example resource object model, in accordance with one or more techniques of the present disclosure.

As noted above, resource manager 306 may be one example of resource manager 106 shown in FIG. 1, which manages resources and resource requests within system 300 using resource policies 310 and resource object model 308, such as described above in reference to FIG. 1. In doing so, global orchestrator 302 may utilize global object model manager 311 to manage the content of global resource object model 308. Global object model manager 311 may manage the addition, removal, and/or modification of objects in resource object model 308. Examples of such objects are illustrated in FIG. 5.

Similar to the description of global orchestrator 102 in FIG. 1, global orchestrator 302 illustrated in FIG. 3 may receive (e.g., via web services 309), from client device 304, a resource request for at least one virtual compute or storage resource to be provided by data centers 320 in distributed computing system 300. The virtual compute resources may include workloads such as virtual machines and/or containers, and virtual storage resources may include storage volumes. For instance, as shown in FIG. 3, data center 320A may include or otherwise provide workloads 338, including one or more virtual machines 340 and one or more containers 342. Data center 320A also includes one or more storage volumes 344.

Upon receiving the request from client device 304, global orchestrator 302 may utilize resource manager 306 to determine a particular resource policy from resource policies 310 that is associated with the resource request. This determined resource policy (e.g., resource policy 210.1 shown in FIG. 2) includes a rule specifying at least one metadata tag and at least one criterion associated with the tag. Global orchestrator 302 may then use resource manager 306 and/or global object model manager 311 to identify any objects included in resource object model 308 that comply with the rule of this resource policy, where these objects each have an assigned value for the metadata tag that satisfies the at least one criterion.

Resource manager 306 of global orchestrator 302 selects one of data centers 320 that is associated with the at least one object identified from resource object model 308. For example, resource manage 306 may select data center 320A. Resource manager 306 then deploys, selected data center 320A, the at least one virtual compute or storage resource for use by client device 304 in response to the resource request. For instance, if the at least one virtual compute or storage resource indicated the resource request is a new application container for an application executing in system 300, resource manager 306 may send a request to data center 320A to allocate one of containers 342 of workloads 338 in data center 320A for use by client device 304. In some cases, resource manager 306 may additionally request allocation of one or more of storage volumes 344 for use in conjunction with the newly allocated container in response to the resource request provided by client device 304.

In some examples, such as the one illustrated in FIG. 3, each data center may include a local orchestrator that manages a local resource object model. For instance, data center 320A includes local orchestrator 322. Local orchestrator 322 includes a local object model manager 336 that is configured to manager local resource object model 334 in data center 320A. Local object model manager 336 may be similar in scope and functionality to global object model manager 311 of global orchestrator 302, but may manage local resource object model 334 of data center 320A. Local resource object model 334 may be similar to global resource object model 308, but may only include objects that are associated with resources for data center 30A. For instance, local resource object model 334 may include objects that associated with workloads 338 (i.e., virtual machines 340 and containers 342), and also with storage volumes 344. Local resource object model 334 may further include objects that are associated with these other objects or with data center 320A in general, such as a location object, a local orchestrator object, link objects, and/or endpoint objects.

Global orchestrator 302 may communicate with local orchestrator 322 of data center 320 (e.g., using network services 313). For example, global orchestrator 302 may push one or more relevant portions of global resource object model 308 down to local orchestrator 322 for inclusion in local resource object model 334. In addition, if local object model manager 336 makes one or more local updates to local resource object model 334 (e.g., based on local analysis of operation of workloads 338 and/or storage volumes 344 on data center 320A), local orchestrator 322 may send these updates to global orchestrator 302 for inclusion in global resource object model 308.

As an example, in certain cases (see, e.g., FIG. 8), global object model manager 311 may instruct local object model manager 336 of local orchestrator 320A to perform one or more tests on data center 320A to assess certain compute, storage, and/or network characteristics (e.g., latency characteristics). Based upon performance of these tests, local object model manager 336 may update metadata tag values of corresponding objects associated with the tests in local resource object model 334. Local orchestrator 322 may then send these updates for global object model manager 311 of global orchestrator 302 for inclusion in global resource object model 308.

Figure 4A:
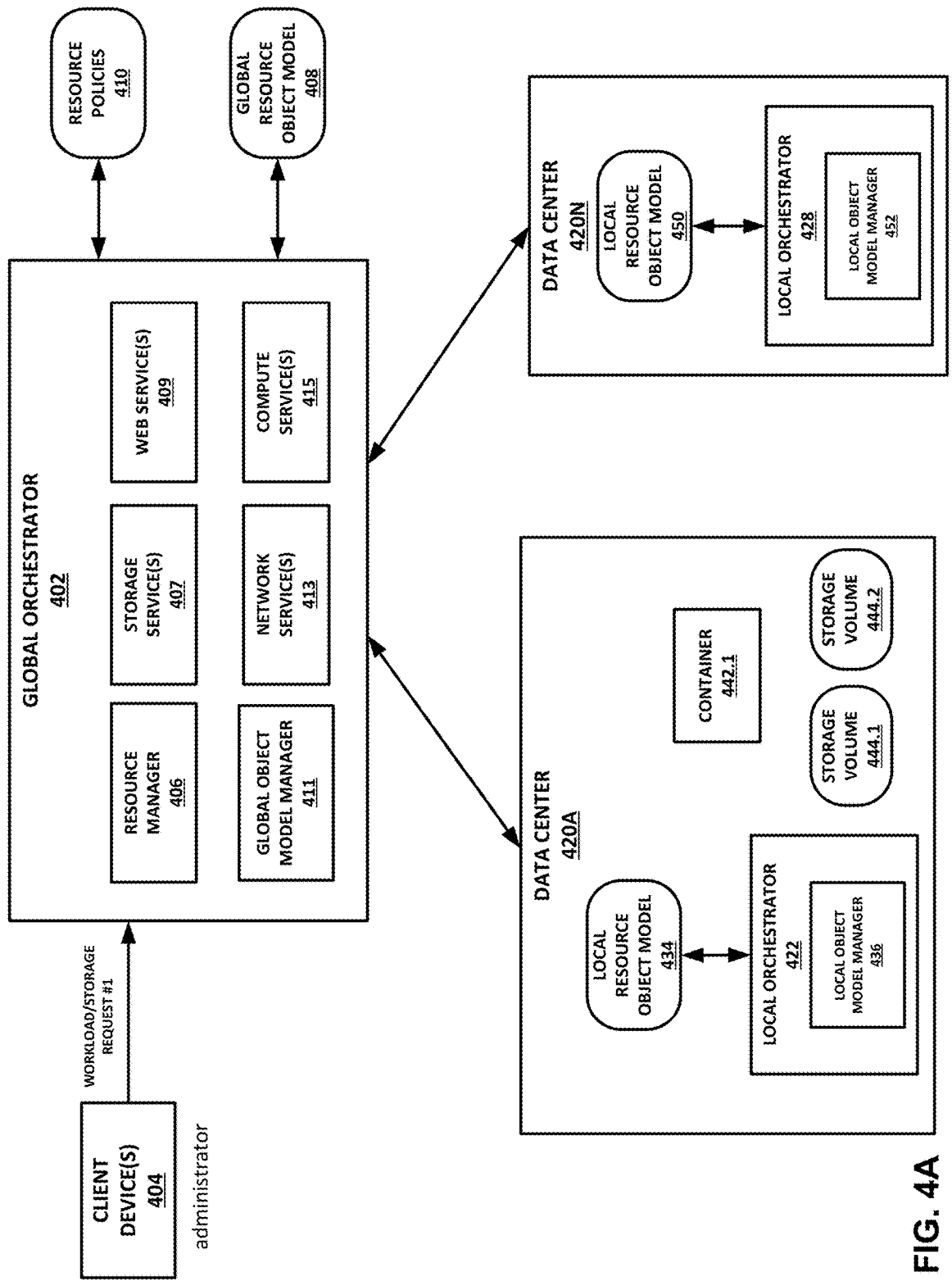
FIGS. 4A-4B are block diagrams illustrating example deployment of containers and/or storage volumes on various different data centers, in accordance with one or more techniques of the present disclosure.
Figure 4B:
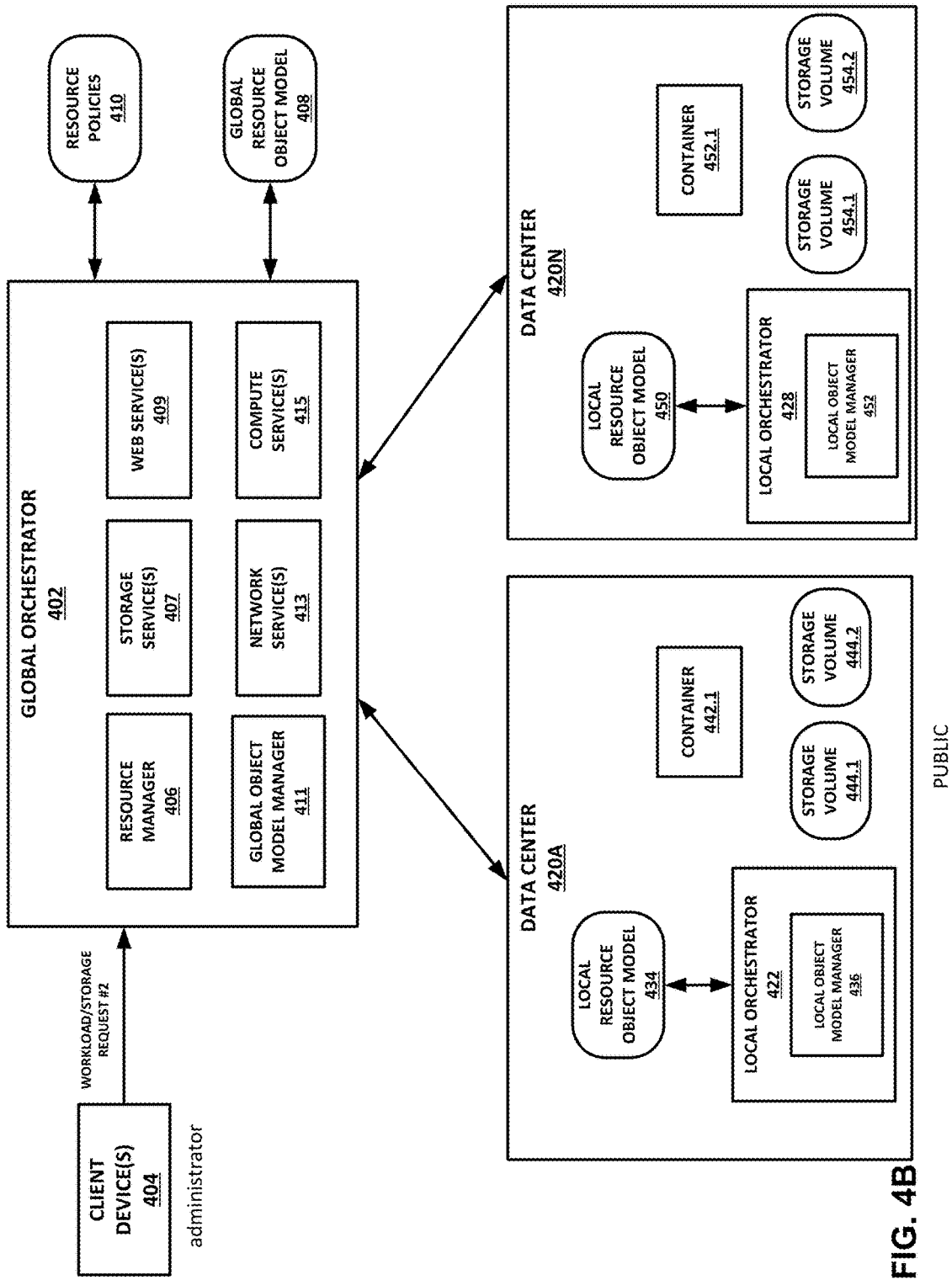

FIGS. 4A-4B are block diagrams illustrating example deployment of containers and/or storage volumes on various different data centers, in accordance with one or more techniques of the present disclosure. In FIG. 4, elements having similar numbers to those in FIG. 3 may provide similar functionality. For instance, similar to global orchestrator 302 shown in FIG. 3, global orchestrator 402 of FIG. 4 includes resource manager 406, storage services 407, web services 409, global object model manager 411, network services 413, and compute services 415. Global orchestrator 402 uses resource policies 410 and global resource object model 408 when processes requests from client device 404.

Similar to data center 320A shown in FIG. 3, which includes local resource object model 334, local orchestrator 322, and local object model manager 336, each of data centers 420A-420N (collectively, "data centers 420") shown in FIGS. 4A-4B also include these elements. For example, data center 420A includes local resource object model 434, local orchestrator 422, and local object model manager 436. Data center 420N includes local resource object model 450, local orchestrator 428, and local object model manager 452.

At a particular point in time, client device 404 may send a resource request to global orchestrator 402 (e.g., via web services 409). In the example of FIG. 4A, this resource request comprises a workload and/or storage volume request ("workload/storage request #1"). Upon receiving the request, resource manager 406 may determine a particular resource policy from resource policies 410 that is associated with the resource request. As described previously, this resource policy includes one or more rules each specifying at least one metadata tag and at least one criterion associated with the at least one metadata tag. For example, the rule may specify a first metadata tag for latency and a second metadata tag for cost. The one or more criterion associated with the latency tag may specify that link objects associated with an orchestrator object in resource object model 408 have a latency tag value that is less than a particular value, and/or that storage volume objects whose link objects from orchestrator objects have a latency tag value that is less than a particular value.

Resource manager 406 and/or global object model manager 411 of global orchestrator 402 then identifies at least one object included in resource object model 408 that complies with this rule of the resource policy. In FIG. 4A, it is assumed that resource manager 406 identifies an object from resource object model 408 that is associated with local orchestrator 422 of data center 420A. At this particular point in time, based on the current information stored in resource object model 408, resource manager 406 may determine that link objects in resource object model 408 that are associated with an object for local orchestrator 422 (e.g., data center object, orchestrator object) have corresponding latency tag values that are less than the particular value specified in the determined resource policy, and/or that storage volume objects in resource object model 408 whose link objects from the object for local orchestrator 422 have latency tag values that are less than the value specified by the determined policy.

Based on this determination, resource manager 406 may select data center 420A for deployment of the container and/or storage volume requested by client device 404, given that data center 420A is associated with the identified object for local orchestrator 422 in resource object model 408. Resource manager 406 may send a deployment request to local orchestrator 422 to allocate or otherwise provide the requested container and/or storage volume on data center 420A. As shown in FIG. 4A, data center 420A may allocate or create container 442.1 and storage volumes 444.1-444.2 in response to the request from client 404. Once these have been created, local orchestrator 422 may send a response to resource manager 406, and web services 409 of global orchestrator 402 may then send a reply to client devices 404 to confirm creation of container 442.1 and storage volumes 444.1-444.2, which may be used by an application executing within the system of FIG. 4A. In some cases, storage volumes 444.1-444.2 may be attached to or otherwise used by container 442.1 during execution of this application.

In some cases, global orchestrator 102 and/or local orchestrator may also update corresponding object models to add objects for the newly created virtual resources. For example, local object model manager 436 may update local resource object model 434 to add a container object associated with container 442.1 and storage volume objects associated with storage volumes 444.1-444.2. Local orchestrator 422 may also provide information for these updates of local resource object model 434 to global orchestrator 402. Global object model manager 411 may update global resource object model 408 to add a container object associated with container 442.1 and storage volume objects associated with storage volumes 444.1-444.2. In some cases, the objects added to the corresponding resource object models may also include the policy previously determined by resource manager 406, such as shown in FIG. 5.

FIG. 4B is a block diagram illustrating an example deployment of additional containers and/or storage volumes at a later point in time, after container 442.1 and storage volumes 444.1-444.2 have been created on data center 420A. At this later point in time, client device 404 may send another resource request to global orchestrator 402 (e.g., via web services 409). In the example of FIG. 4B, this resource request comprises another workload and/or storage volume request ("workload/storage request #2"). Upon receiving the request, resource manager 406 may again determine a particular resource policy from resource policies 410 that is associated with the resource request.

In some cases, this new resource request may be a request for the same type or number of resources as the first request shown in FIG. 4A. For example, client device 404 may request creation of a container and two storage volumes for use with an application. In response to receiving this new resource request, resource manager 406 may select the same resource policy from resource policies 410 that it selected in response to receiving the first resource request from FIG. 4A, where the selected policy includes a rule specifying a first metadata tag for latency and a second metadata tag for cost. The one or more criterion associated with the latency tag may specify that link objects associated with an orchestrator object in resource object model 408 have a latency tag value that is less than a particular value, and/or that storage volume objects whose link objects from orchestrator objects have a latency tag value that is less than a particular value.

Resource manager 406 and/or global object model manager 411 of global orchestrator 402 once again identifies at least one object included in resource object model 408 that complies with this rule of the resource policy. However, although client device 404 is again requesting a container and two storage volumes, in the example of FIG. 4B, resource manager 406 identifies an object from resource object model 408 that is associated with local orchestrator 428 of data center 420N. At this particular point in time, based on the current information stored in resource object model 408, resource manager 406 may determine that link objects in resource object model 408 that are associated with an object for local orchestrator 428 (e.g., data center object, orchestrator object, location object) have corresponding latency tag values (e.g., network latency tag values) that are less than the particular value specified in the determined resource policy, and/or that storage volume objects in resource object model 408 whose link objects from the object for local orchestrator 428 have latency tag values (e.g., network and/or storage latency tag values) that are less than the value specified by the determined policy. Storage volume objects may also have storage latency tag values that may be compared to one or more values specified by the determined policy.

Based on this determination, resource manager 406 may select data center 420N for deployment of the container and/or storage volume requested by client device 404, given that data center 420N is associated with the identified object for local orchestrator 428 in resource object model 408. Although, in FIG. 4A, resource manager 406 previously had identified an object from global resource object model 408 associated with local orchestrator 422 of data center 420A, at a later point in time, shown in FIG. 4B, resource manager 406 may identify a completely different object from global resource object model 408 associated with local orchestrator 428 of data center 420N, even though client device 404 has requested that same type and/or number of virtual resources (e.g., one container and two storage volumes) for the same application. Resource manager 406 may select a different object based upon changes to the objects, metadata tags, criteria, rules, and/or other information included in global resource object model 408 over time. The information included in global resource object model 408, as well as in local resource object models (e.g., local resource object mode 434 and local resource object model 450), is updated dynamically over time and can change based upon various factors within the distributed computing system that includes data centers 420. For example, as various resources are allocated or created in data centers 420, various characteristics such as latency between or within data centers 420, and cost metrics associated with operation of data centers 420, may change. These changes are then reflected in updates to the various resource object models (global resource object model 408, local resource object model 434, local resource object model 450), which are used by resource manager 406 when determining on which data center to deploy or create workloads (e.g., containers) and storage volumes.

After resource manager 406 has selected data center 420N for deployment of the container and two storage volumes requested by client devices 404, resource manager 406 may send a deployment request to local orchestrator 428 to allocate or otherwise create the requested container and/or storage volume on data center 420N. As shown in FIG. 4B, data center 420N may allocate or create container 452.1 and storage volumes 454.1-454.2 in response to the request from client 404. Once these have been created, local orchestrator 428 may send a response to resource manager 406, and web services 409 of global orchestrator 402 may then send a reply to client devices 404 to confirm creation of container 452.1 and storage volumes 454.1-454.2, which may be used by an application executing within the system of FIG. 4B. In some cases, storage volumes 454.1-454.2 may be attached to or otherwise used by container 452.1 during execution of this application.

FIG. 5 is a block diagram illustrating an example resource object model 560, in accordance with one or more techniques of the present disclosure. Resource object model 560 may be one example of global resource object model 108 (FIG. 1), global resource object model 308 (FIG. 3), local resource object model 334 (FIG. 3), global resource object model 408 (FIGS. 4A-4B), local resource object model 434 (FIGS. 4A-4B), and/or local resource object model 450 (FIGS. 4A-4B).

As illustrated in FIG. 5, resource object model 560 may include various different objects, such as one or more location objects 562, orchestrator and/or data center objects 568, storage volume objects 574, link objects 580, endpoint objects 586, workload objects 590, and/or other resource objects 590. Although not illustrated in FIG. 5, resource object model 560 may include various different objects that may be used or accessed by an orchestrator, such as global orchestrator 102/302/402 in identifying objects associated with resources within a distributed computing system. Any object included within resource object model 560 may include one or more additional objects. For instance, an orchestrator object may include one or more location objects, one or more storage volume objects, one or more link objects, one or more endpoint objects, and one or more workload objects.

As indicated in FIG. 5, and as also described above, every object included in FIG. 5 may include one or more associated metadata tags and corresponding values. Each individual metadata tag may represent one or more virtual and/or physical characteristics of a resource associated with the corresponding object (e.g., latency, cost, region/location, compute or storage class), as well as values for these metadata tags (e.g., latency values such as network and/or storage latency values, cost values, region/location values, compute or storage class values). In addition, in some cases, an object may also include a copy of or link to one or more resource policies that are associated with the object, which also be included in the resource policies of a global orchestrator (e.g., resource policies 110/310/410). The resource policies included with the objects of resource object model 560 may include policies previously determined by the global orchestrator when determining a data center on which to create a requested resource whose corresponding object is then added or updated within resource object model 560. Thus, the resource policies of objects in resource object model 560 may include one or more rules that each specify at least one criterion associated with the metadata tag.

As shown in FIG. 5, one or more location objects in resource object model 560 may each include one or more metadata tags and corresponding values 564, and may also include a copy or link to one or more assigned resource policies 566, which may also be included in resource policies 110/310/410. Location objects 562 may be associated with particular locations (e.g., physical or virtual locations) within a distributed computing system, and tags/values 564 may be associated with one or more characteristics or properties of these locations (e.g., type or name location, region, latency, cost, etc.).

Orchestrator and/or data center objects 568 may include one or more metadata tags and corresponding values 570, and may also, in some cases, include assigned resource policies 572. Orchestrator and/or data center objects 568 may be associated with particular orchestrators (e.g., global or local orchestrators) within a distributed computing system, and tags/values 570 may be associated with one or more characteristics or properties of these orchestrators (e.g., type of orchestrator, latency, cost, region/location, provider, performance, etc.).

Storage volume objects 574 may include one or more metadata tags and corresponding values 576, and may also, in some cases, include assigned resource policies 578. Storage volume objects 574 may be associated with particular storage volume (e.g., storage volumes 344/444/454) within a distributed computing system, and tags/values 576 may be associated with one or more characteristics or properties of these storage volumes (e.g., type of storage volume, latency, cost, region/location, provider, performance, etc.).

Link objects 580 may include one or more metadata tags and corresponding values 582, and may also, in some cases, include assigned resource policies 584. Link objects 580 may be associated with links within a distributed computing system (e.g., links between locations, links between orchestrators, links to storage volumes or workloads) and links from resources inside a distributed computing system to external resources (e.g. from a user location to data center locations), and tags/values 582 may be associated with one or more characteristics or properties of these links (e.g., type of link, direction, latency, cost, region/location, provider, performance, etc.).

Endpoint objects 586 may include one or more metadata tags and corresponding values 587, and may also, in some cases, include assigned resource policies 588. Endpoints objects 586 may be associated with endpoints within a distributed computing system (e.g., locations, orchestrators, storage volumes, or workloads), and tags/values 587 may be associated with one or more characteristics or properties of these endpoints (e.g., type of endpoint, latency, cost, region/location, provider, performance, etc.).

Workload objects 593 includes one or more virtual machine objects 594 and one or more container objects 597. Virtual machine objects 594 may include one or more metadata tags and corresponding values 595, and may also, in some cases, include assigned resource policies 596. Container objects 597 may include one or more metadata tags and corresponding values 598, and may also, in some cases, include assigned resource policies 599. Virtual machine objects 594 and/or container objects 597 may be associated with virtual machines and/or containers within a distributed computing system, and tags/values 595 and/or 598 may be associated with one or more characteristics or properties of these workloads (e.g., type of workload, latency, cost, region/location, provider, performance, etc.).

As shown in FIG. 5, resource object model 560 may further include one or more other resource objects 590. Objects 590 may include one or more metadata tags and corresponding values 591, and may also, in some cases, include assigned resource policies 592.

FIGS. 6A-6C are diagrams illustrating examples of resource policies, or templates, which may be used within a distributed computing system, in accordance with one or more techniques of the present disclosure. For instance, the resource policies represented in FIGS. 6A-6C mat be included in resource policies 110 (FIG. 1), resource policies 310 (FIG. 3), and/or resource policies 410 (FIG. 4). Each of these policies may include one or more rules that specify one or more metadata tags and one or more associated criteria.

For example, FIG. 6A illustrates a first example resource policy, or policy template, 600. Policy 600 includes one or more rules that specify one or more metadata tags and one or more criteria. In some cases, each rule is associated with a particular tag-criteria combination. In some cases, each rule may be associated with multiple tag-criteria combinations. In certain instances, certain tag-criteria combinations may comprise policies or sub-policies that are included in or otherwise referenced by policy 600.

In FIG. 6A, the one or more rules of policy 600 include various distinct metadata tags, namely "latency," "replicas," "cost," "PCI compliance," "tier," "region," "provider," "compute class," and "storage class." Each of these tags may represent one or more characteristics or parameters associated with one or more virtual or physical resources. The one or more rules of policy 600 also specify various criteria that are associated with corresponding tags. The values of any of the tags included in policy 600 may be manually assigned or automatically determined by the system.

For instance, the "latency" tag may represent a latency characteristic of one or more resources, including link resources, within the system. The criterion associated with this tag, as shown in FIG. 6A, specifies that the value of the "latency" tag be less than 10 ms.

The "replicas" tag may represent a characteristic associated with the number of replicas, or copies, of a resource (e.g., container, storage volume) within the distributed computing system. The indicated criterion of policy 600 specifies that value of the "replicas" tag be equal to 5.

The "cost" tag may represent a characteristic associated with the cost (e.g., virtual or actual cost) of one or more resources in the system. The indicated criterion of policy 600 specifies that there is no particular limit on the value of the "cost" tag.

The "PCI compliance" tag may represent a characteristic associated with the type or level of PCI compliance of one or more resources in the system. The indicated criterion of policy 600 specifies that the value of the "PCI compliance" tag is equal to "P2PE."

The "region" tag may represent a characteristic associated the physical or virtual location/region (e.g., country, state, city, etc.) of one or more resources in the system. The indicated criterion of policy 600 specifies that the value of the "region" tag be equal to "New York." Policies tied to the region tag may, in some cases, correspond to government regulatory requirements relating to privacy, law enforcement, data retention, and so forth.

The "provider" tag may represent a characteristic associated with the service provider that provides one or more resources in the system. The value of this tag may represent the name of a company or vendor providing the services for these resources. The indicated criterion of policy 600 specifies that the value of the "provider" tag be equal to "Data Center," which may a generic or specific name of a service provider that provides data center services. (Other example values may be names of particular service providers, such as "Provider Name A," "Provider Name B," or the like.)

The "compute class" tag may represent a characteristic associated with compute resources in the system, such as the number of computing/processor cores, and/or the amount of memory. The indicated criteria of policy 600 specifies that the values of the "compute class" tag specify a 16-core processing system having 256 GB of RAM.

The "storage class" tag may represent a characteristic associated with storage resources in the system, such as the number or type of storage resources. The indicated criterion of policy 600 specifies that the value of the "storage class" tag specify a type of non-volatile memory express (NVME) for the storage resources.

FIGS. 6B-6C illustrate alternate examples of policies 602 and 604. As shown in FIGS. 6B-6C, policies 602 and 604 includes the same metadata tags as policy 600, but specify slightly different rules and/or criteria associated with these types. For example, policies 602 and 604 specify different criteria associated with the "latency," "replicas," "cost," "PCI compliance," "region" "provider," "compute class," and "storage class" tags. As shown in these figures, certain criteria may include minimum threshold criteria, maximum threshold criteria, and/or equality criteria.

In various cases, a global orchestrator, such as global orchestrator 102, may determine to select resource policy or template from resource policies 110 upon receiving a resource request from client device 104. Global orchestrator 102 may determine to select a particular, such as policy 600, 602, or 604 based upon one or more factors. For instance, in response to receiving a resource request from client device 104, global orchestrator 102 may identify policy 600, 602, or 604 based on the geographic location of client device 104. In another example, global orchestrator 102 may determine a policy based on a type of application associated with the resource request. If, for example, the application is a database application, global orchestrator 102 may identify policy 600 having rules that are tailored or optimized for database operations within system 100. However, if application is a streaming audio application, global orchestrator 102 may identify a different resource policy 602 having rules that are suitable or optimized for streaming audio operations or applications within system 100. In some cases, global orchestrator 102 may determine the particular resource policy from resource policies 110 based on a type of the at least one virtual compute or storage resource indicated by the resource request (e.g., container or storage volume), or a quantity of at least one virtual compute or storage resource indicated by the resource request.

FIG. 7 is a diagram illustrating another example resource policy 710, in accordance with one or more techniques of the present disclosure. Policy 710 is another example of a policy that may be included in resource policies 110 (FIG. 1), resource policies 310 (FIG. 3), and/or resource policies 410 (FIG. 4).

As indicated in FIG. 7, policy 710 has a name of "example_policy," and includes various rules that specify certain metadata tags and corresponding criteria that are associated with these tags. A global orchestrator, such as global orchestrator 102, may assess policy rules against the tags on the objects and links in its object model (e.g., resource object model 108) to find which locations and/or data centers satisfy the policy, including optimizing for, e.g., user latency and costs if these have been modeled and are included in the policy. The policy for a workload or storage volume can be created as one or more files (e.g., YAML Ain't Markup Language (YAML) files) that encode a series of rules that must be satisfied (e.g., in turn).

For example, policy 710 requires that the "location" tag have a value of "France," and that the "user_location" tag have a value of "Paris," "Renne," "Marseilles," or "Montpellier." Thus, when using policy 710 to identify a data center on which to deploy or otherwise create resources, as described above, a global orchestrator, such as global orchestrator 102, may identify any data centers having local orchestrators (e.g., orchestrator 122 of data center 120A) having an orchestrator object (e.g., in resource object model 108) that includes a location object having a value of "France" for the metadata "location" tag. As noted in reference to FIG. 5, any object in a resource object model may include one or more other objects. In addition, global orchestrator 102 may attempt to identify any local orchestrator objects in resource object model 108 having a value of "Paris," "Renne," "Marseilles," or "Montpellier" for the metadata "user_location" tag.

In some cases, global orchestrator 102 (e.g., using resource manager 106) may identify any local orchestrator objects that satisfy these rules or criteria of policy 710, and identify corresponding one or more data centers on which to create resources (e.g., containers, storage volumes) based on the identified objects. However, in other examples, global orchestrator 102 may utilize the sub-policy of policy 710, named "workload_policy," to identify compliant orchestrator objects that satisfy the rules of policy 710.

As shown in FIG. 7, the sub-policy of policy 710, named "workload_policy," specifies further rules associated with orchestrator and storage objects in a resource object model, such as resource object model 108. For instance, this sub-policy requires that orchestrator objects have a value of the "type" tag that is equal to "container" (versus "virtual machine"). In addition, this sub-policy also requires that link objects for orchestrator objects having a value of the "user_latency" tag that is less than 15 ms, that objects have a value of the "storage_latency" tag is less than 20 ms, and that the orchestrator object have a minimum value of the "cost" tag. Further, the sub-policy requires that link objects having a value of "from" for the "direction" tag with respect to the object "user_location" (i.e., links from the "user_location" object) have a value of the "latency" tag that is less than 50 ms.

In addition, this sub-policy requires that storage volume objects included in or associated with the orchestrator object have a value of the "type" tag that is equal to file and have a minimum value of the "cost" tag. These storage objects also must have a value of the "performance" tag that is greater than 1.5 GB/s. Finally, the sub-policy requires that storage objects whose links from the orchestrator object have a value of the "latency" tag that is less than 20 ms.

In certain cases, the rules provided by policy 710 may be evaluated according to the following precedence. Rules for tags on objects, including equality and maximum/minimum threshold checks, may be processed first. Rules for tags on objects that are selected by rules for tags on objects, including equality and maximum/minimum threshold checks, may be then be processed. Maximum and minimum (max=−1, or min=−1) rules for objects followed by links or tags may then be processed. In some cases, if multiple maximum and minimum rules are applied to the same object type, the rules may be evaluated in order until there is only one object selected, and no further rules may be evaluated. The units for tag values may, in some cases, be specified in the specification or documentation for each tag, and therefore may not necessarily be expressed or provided in the policy definitions.

In some examples, multiple workloads or storage volumes may have the same policy applied to them, and policies may contain references by name to other policies, so that, for instance, workloads performing the same function in different countries could require the same latency and performance without explicitly having to write rules in each policy. Additionally, if such a reused policy is updated (e.g., resource policies 110), existing workloads could be relocated (e.g., by global orchestrator 102) in order to comply with the new policy. Such updates can be automatic, automatic following approval by an administrator based on input from client devices 104, or manually updated via a script or command (e.g., based on input from client devices 104).

FIG. 8 is a conceptual diagram illustrating an example of latency tag values for a resource object model, in accordance with one or more techniques of the present disclosure. As described earlier, in some cases, a global orchestrator, such as global orchestrator 102, may either individually or in conjunction with one or more orchestrators of data centers 112, 120 (e.g., orchestrator 114, 122, and/or 128), perform an automatic analysis and determine various characteristics of these data centers (e.g., geographic location/region characteristics, latency characteristics, cost characteristics, provider characteristics, compute/storage class characteristics). Global orchestrator 102 may then assign or update the values of metadata tags associated with these characteristics for corresponding objects in resource object model 108. FIG. 8 illustrates one example of latency tag values that may be determined by one or more of these orchestrators within a distributed computing system, such as system 100, and making corresponding updates to an object model, such as global resource object model 108.

For instance, global orchestrator 102 working in conjunction with one or more local orchestrators such as orchestrators 114, 122, and/or 128, may be capable of automatically determining metadata tag values that indicate, for instance, latency of links and performance of storage, to name only a few examples. Global orchestrator 102 may have a list of all the locations, orchestrators, and storage systems in distributed computing system 100. Additionally, global orchestrator 102 can have a list of endpoints that may be application programming interface (API) endpoints for certain third-party services, or that may be locations from where users would be accessing resources.

In some examples, global orchestrator 102 may instruct each local orchestrator, such as local orchestrators 114, 122, and/or 128 to create special probe workloads (e.g., one of workloads 338 shown for data center 320A and local orchestrator 322). These probe workloads executed on corresponding data centers may be preloaded with, or automatically download from global orchestrator 102, a list of test endpoints (e.g., virtual machines, containers, storage volumes) and tests to be run against each endpoint. These tests can include, as non-limiting examples: pings to measure latency; pings of specific transmission control transport (TCP) ports to measure latency for a particular application; HTTP gets from a web server (running on, for instance, a probe running in a target location); time for file transfer of a large file into virtual memory (e.g., memory-mapped storage); time for file transfer of a large file into virtual machine local storage; and/or latency and storage performance extracted from a series of increasingly large file transfers into storage. The set of test endpoints for each orchestrator location may contain all possible endpoints, or may be a subset that excludes endpoints that would not be used from that orchestrator location.

Once each probe has completed the tests for each target, the results are sent back from the local orchestrators to global orchestrator 102, which then uses them to populate and/or update global resource object model 108. For example, global orchestrator 102 may update, based on the received test results from local orchestrators 114, 122, and/or 128, assigned values of one or more metadata tags of one or more objects included in global resource object model 108. In certain cases, link objects are unidirectional between other objects, since firewalls and other networking devices may be asymmetric in their latency, and indeed the network paths may be quite different in each direction. However, in some cases, traffic only originates from one location, so while there can be a link object in each direction between workload orchestrator locations, there may only be a link from each workload orchestrator location to each storage location (e.g., location for a storage volume).

FIG. 8 illustrates updates that may be made to global resource object model 108 based on test results received from multiple different local orchestrators. The test results may be indicative of latency tag values between objects 822, 824, 826, and 828. These objects 822, 824, 826, and 828 may be one or more of location, endpoint, orchestrator, and/or workload (e.g., virtual machine or container) objects, and the arrows shown in FIG. 8 may represent link objects between objects 822, 824, 826, and 828.

For instance, objects 822, 824, 826, and 828 may represent local orchestrator objects that are associated with local orchestrator 114, 122, 128, and one additional local orchestrator of remote data centers 120. The arrows may represent link objects between these local orchestrators. Thus, one link object may have a direction tag value indicative of a direction from object 822 to object 828, and may have a latency tag value of 15 ms. Another link object may have a direction tag value indicative of a direction from object 828 to object 822, and may have a latency tag value of 23 ms.

Similarly, another link object may have a direction tag value indicative of a direction from object 828 to object 826, and may have a latency tag value of 183 ms, while yet another link object may have a direction tag value indicative of a direction from object 826 to object 828, and may have a latency tag value of 165 ms. The remaining direction and latency tag values of various other link objects are indicated in FIG. 8. Based on these values, global orchestrator 102 may automatically update the corresponding metadata tag values for link objects associated with orchestrator objects 822, 824, 826, and 828 in global resource object model 108. In such fashion, global orchestrator 102 may either individually or in conjunction with one or more local orchestrators perform an automatic analysis and determine various characteristics of these data centers, and then assign or update the values of metadata tags associated with these characteristics for corresponding objects in resource object model 108.

Figure 9:
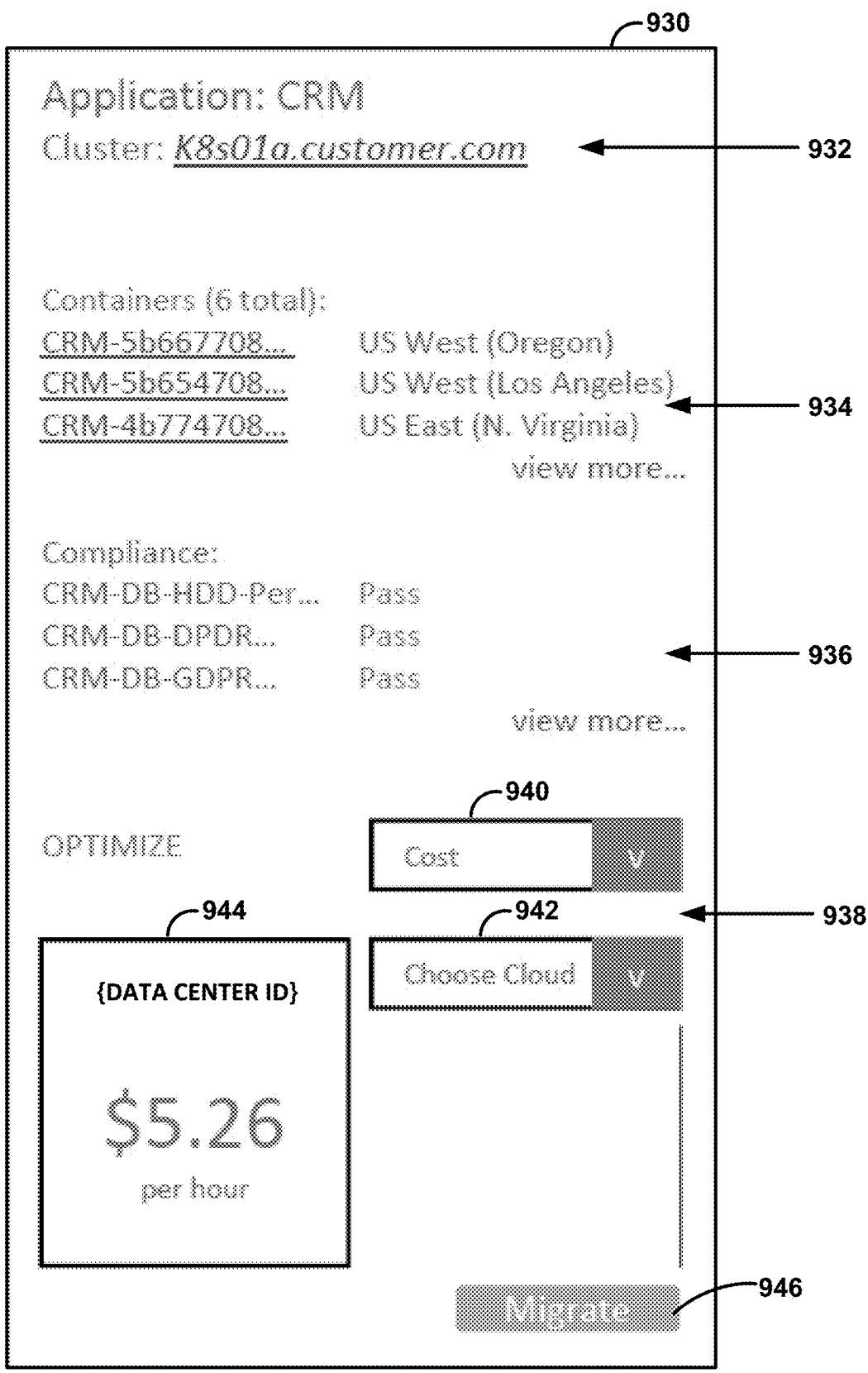
FIG. 9 is a screen diagram illustrating container and policy compliance information, in accordance with one or more techniques of the present disclosure.

FIG. 9 is a screen diagram illustrating container and policy compliance information, in accordance with one or more techniques of the present disclosure. In some cases, a global orchestrator, such as global orchestrator 102 shown in FIG. 1, may output graphical window 930 for display at a client device, such as client device 104. Window 930 may include visual representations of various information, including a visual representation of selected data centers and/or locations in which virtual compute or storage resources (e.g., containers) have been deployed in a distributed computing system, such as system 100, in response to one or more resource requests.

For example, over time, client device 104 may issue various resource requests for application containers and corresponding storage volumes that are executed with a particular application that executes in system 100, such as a customer relationship manager (CRM) application. Global orchestrator 102 may respond to such requests by deploying containers and storage volumes across one or more data centers 112, 120 within system 100, based on the tagging and resource management and policy handling described herein. As a result, the containers and/or storage volumes for a given CRM application may be deployed and created on different data centers.

The group of data centers on which these containers and storage volumes are created for the CRM application may be referred to as a cluster, and area 932 of window 903 illustrated in FIG. 9 includes an example name for this cluster (i.e., "K8s01a.customer.com). Area 934 of window 930 includes a graphical representation of the individual containers that have been deployed or otherwise created for the CRM application within this cluster. In the example of FIG. 9, six individual containers have been deployed by global orchestrator 102, using the techniques described herein, within system 100. Area 934 indicates the name of each container, as well as an identifier of the location/data center on which the corresponding container has been created. For example, the container named "CRM-5b667708 . . ." was created in the "US West (Oregon)" data center (e.g., data center 120A), while the container named "CRM-4b774708 . . . " was created in the "US East (N. Virginia)" data center (e.g., data center 120N). With a single snapshot view provided by window 930, a user of client device 104 may be able to see where all containers for the CRM application have been deployed within system 100.

In addition, the user may be able to assess the overall compliance with these containers for the CRM application with respect to various different resource policies included in resource policies 110, as the resources are created and used within system 100. For example, area 936 of window 930 shows a list of certain resource policies that are associated with, or that have been assigned (e.g., by global orchestrator 102) to, the containers of the CRM application. Area 936 indicates that there are three such policies, and each policy may be assigned to one or more of the six containers. As described herein, global orchestrator 102 may determine and/or assign policies to containers that are requested by client devices 104. In a single snapshot view in area 936 of window 930, a user may identify the particular policies applied to the various containers of the CRM application, and whether or not the containers or other created resources (e.g., storage volumes) are in compliance ("Pass") or non-compliance ("Fail") with the corresponding policies. In some cases, certain policies (e.g., policy named "CRM-DB-GDPR . . . ") may be related to general data protection regulation (GDPR) requirements, where the policy sets forth certain rules that are to be complied with regarding the placement of resources only within identified or predetermined geographic locations. Area 936 provides information as to whether there is current compliance or non-compliance with such policies.

In some cases, a user may also wish to identify various different parameters or characteristics associated with executed of the CRM application within system 100. For example, the user may wish to view characteristics associated with latency, cost, performance, or other items during application execution using the resources identified in area 934. To do so, user may interact with area 938 of window 930. In the example of FIG. 9, the user has selected the "Cost" parameter from a menu 940 included in area 938. Upon choosing one or more data center identifiers from menu 942, area 938 may update its display of sub-area 944 to display the selected data center identifier and the average cost metric (e.g., cost per hour) associated with the selected data center during execution of the CRM application. The user may select a different data center identifier from menu 942 to view corresponding cost information for that different data center in sub-area 944.

As a result, the user can determine which data centers are currently providing an optimal cost metric for currently deployed containers of the CRM application. The user may also select a different parameter from menu 940 (e.g., "performance" or "latency" parameter) to view corresponding performance or latency metrics for selected data centers in sub-area 944. These various different parameters and metrics are associated with corresponding metadata tags (e.g., cost tags, performance tags, latency tags) that are associated with the container objects for the containers identified in area 934. In certain cases, a user may be able to manually migrate containers to different data centers using button 946. Upon selecting a particular data center from menu 942 and then selecting button 946, a user may be able to manually migrate one or more of the containers shown in area 934 to a selected data center (e.g., based on optimal cost/performance/latency metrics shown in sub-area 944.

Figure 10:
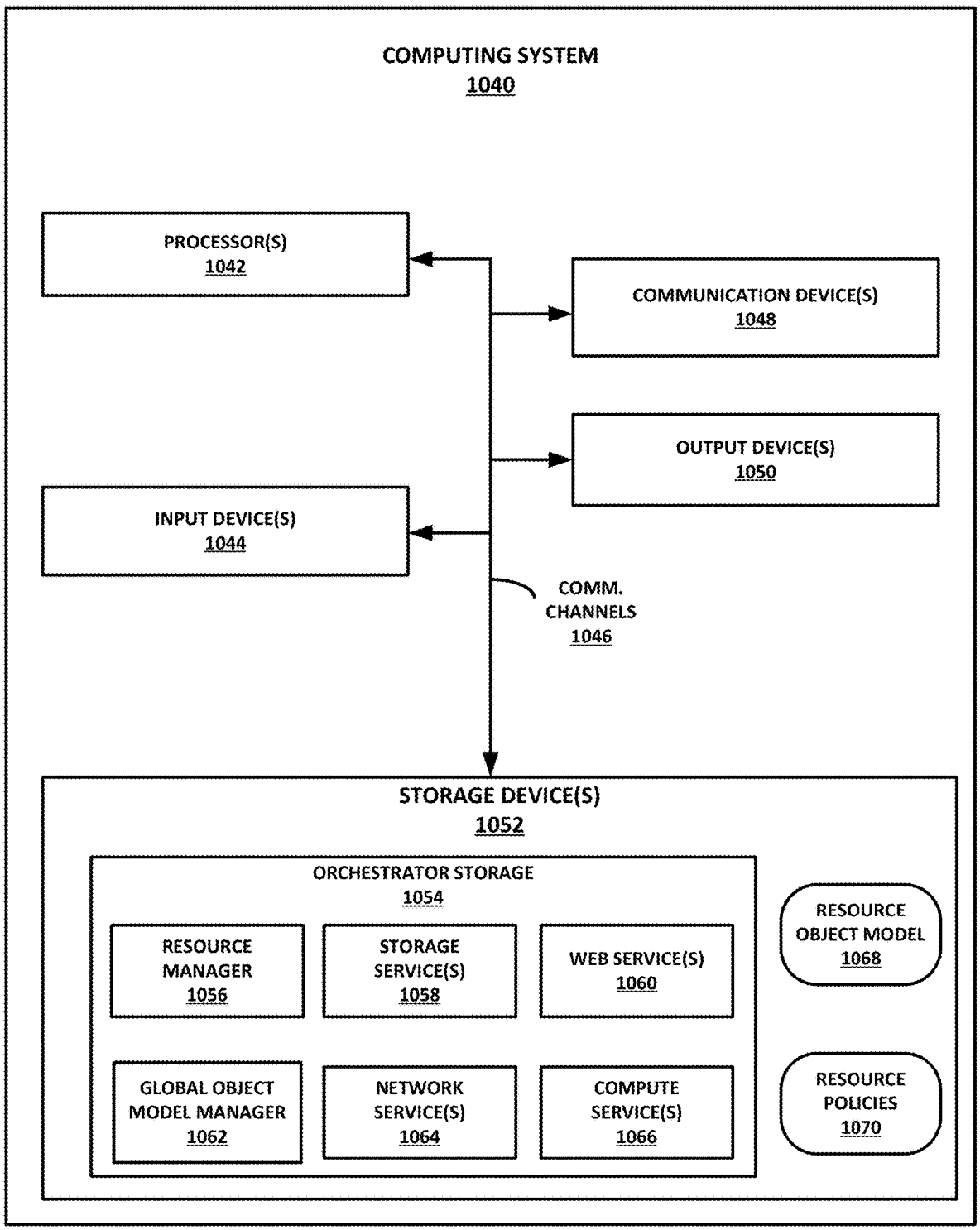
FIG. 10 is a block diagram illustrating an example computing system, in accordance with one or more techniques of the present disclosure.

FIG. 10 is a block diagram illustrating an example computing system 1040, in accordance with one or more techniques of the disclosure. Computing system 1040 may include or implement one or more of the nodes, containers, storage resources/volumes, models, policies, applications, orchestrators, services, and/or other components described herein and shown in FIGS. 1-5. FIG. 5 illustrates only one particular example of computing system 1040, and many other examples of computing system 1040 may be used in other instances and may include a subset of the components shown, or may include additional components not shown, in FIG. 5.

As shown in the example of FIG. 5, computing system 1040 includes one or more processors 1042, one or more input devices 1044, one or more communication devices 1048, one or more output devices 1050, and one or more storage devices 1052. In some examples, computing system 1040 may not include input devices 1044 and/or output devices 1050. Communication channels 1046 may interconnect each of the components 1042, 1048, 1044, 1050, and 1052 for inter-component communications (physically, communicatively, and/or operatively). In some examples, communication channels 1046 may include a system bus, a network connection, an inter-process communication data structure, or any other method for communicating data between hardware and/or software.

One or more input devices 1044 of computing system 1040 may receive input. Examples of input are tactile, audio, and video input. Examples of input devices 1044 include a presence-sensitive screen, touch-sensitive screen, mouse, keyboard, voice responsive system, video camera, microphone or any other type of device for detecting input from a human or machine.

One or more output devices 1050 of computing system 1040 may generate output. Examples of output are tactile, audio, and video output. Examples of output devices 1050 include a presence-sensitive screen, sound card, video graphics adapter card, speaker, cathode ray tube (CRT) monitor, liquid crystal display (LCD), or any other type of device for generating output to a human or machine. Output devices 1050 may include display devices such as cathode ray tube (CRT) monitor, liquid crystal display (LCD), or any other type of device for generating tactile, audio, and/or visual output.

One or more communication devices 1048 of computing system 1040 may communicate with one or more other computing systems or devices via one or more networks by transmitting and/or receiving network signals on the one or more networks. Examples of communication devices 1048 include a network interface card (e.g. such as an Ethernet card), an optical transceiver, a radio frequency transceiver, or any other type of device that can send and/or receive information, such as through a wired or wireless network. Other examples of communication devices 1048 may include short wave radios, cellular data radios, wireless Ethernet network radios, as well as universal serial bus (USB) controllers.

One or more storage devices 1052 within computing system 1040 may store information for processing during operation of computing system 1040 (e.g., computing system 1040 may store data accessed by one or more modules, processes, applications, services, nodes, application containers, orchestrators, or the like during execution at computing system 1040). In some examples, storage devices 1052 on computing system 1040 may be configured for short-term storage of information as volatile memory and therefore not retain stored contents if powered off. Examples of volatile memories include random access memories (RAM), dynamic random-access memories (DRAM), static random access memories (SRAM), and other forms of volatile memories known in the art. In some cases, storage devices 1052 may include redundant array of independent disks (RAID) configurations and one or more solid-state drives (SSD's).

Storage devices 1052, in some examples, also include one or more computer-readable storage media. Storage devices 1052 may be configured to store larger amounts of information than volatile memory. Storage devices 1052 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 1052 may store program instructions and/or data associated with one or more software/firmware elements or modules.

For example, storage devices 1052 may store instructions and/or corresponding data for orchestrator storage 1054 (e.g., for a global orchestrator such as global orchestrator 102 in FIG. 1; a local orchestrator such as orchestrator 122). As shown in FIG. 10, orchestrator storage 1054 may include instructions and/or corresponding data for resource manager 1056 (e.g., resource manager 306), storage services 1058 (e.g., storage services 307), web services 1060 (e.g., web services 309), global object model manager 1062 (e.g., global object model manager 311), network services 1064 (e.g., network services 313), and compute services 1066 (e.g., compute services 315). Storage devices 1052 may also store resource object model 1068 (e.g., global resource object model 308; local resource object model 334) and resource policies 1070 (e.g., resource policies 110). The components stored in storage devices 1052 may be examples of similarly named components shown in FIGS. 1-5. Storage devices 1052 may also store instructions and/or corresponding data for other components, such as storage resources (e.g., storage resources 126), compute resources (e.g., compute resources 124), workloads (e.g., workloads 338), and/or storage volumes (e.g., storage volumes 344).

Computing system 474 further includes one or more processors 1042 that may implement functionality and/or execute instructions within computing system 1040. For example, processors 1042 may receive and execute instructions stored by storage devices 1052 that execute the functionality of the elements and/or modules described herein. These instructions executed by processors 1042 may cause computing system 1040 to store information within storage devices 1052 during program execution. Processors 1042 may also execute instructions of an operating system to perform one or more operations described herein.

Figure 11:
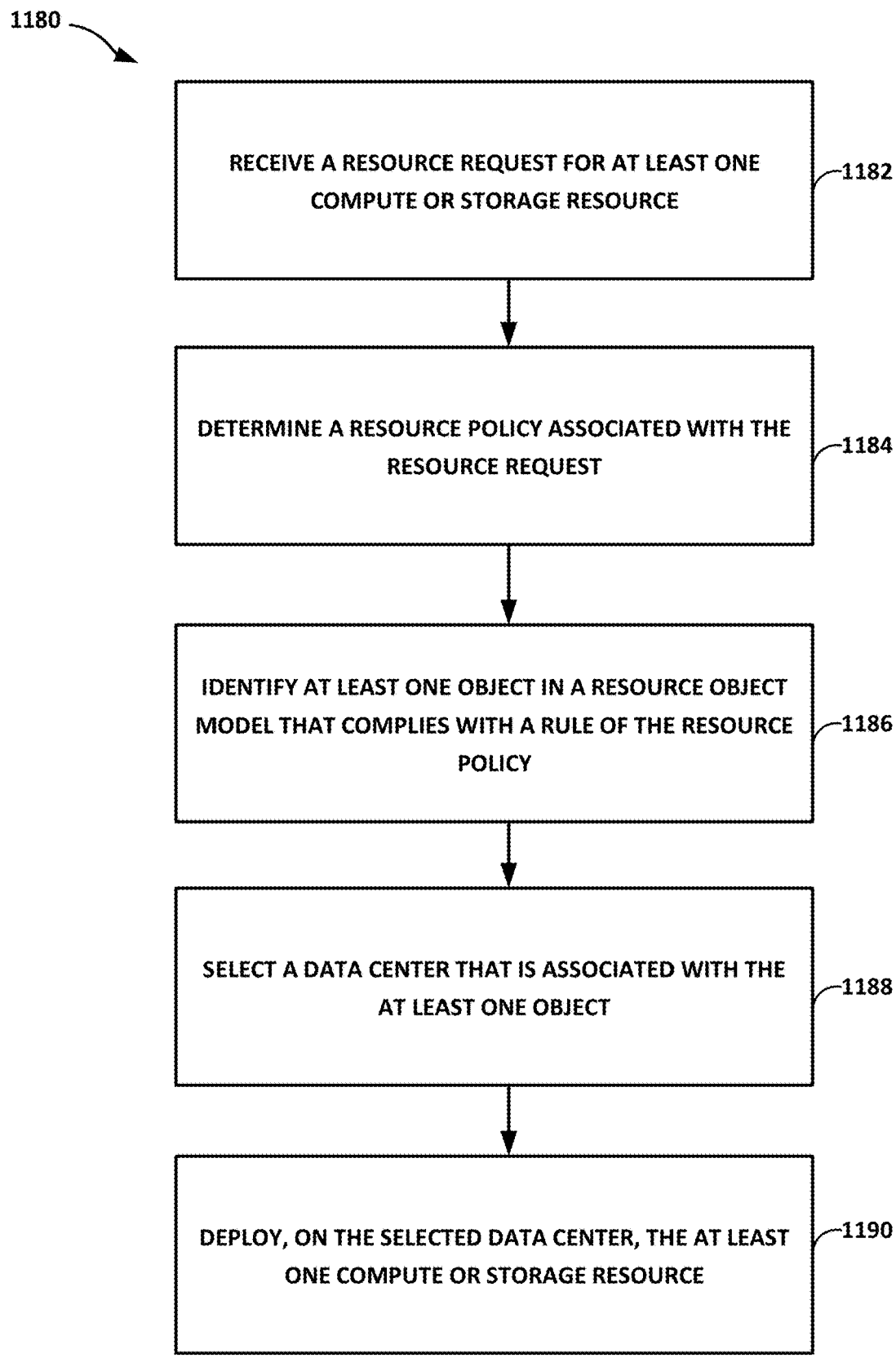
FIG. 11 is a flow diagram illustrating an example process to select a data center for allocating compute and/or storage resources in a distributed computing system, in accordance with one or more techniques of the disclosure present.

FIG. 11 is a flow diagram illustrating an example process 1180 to select a data center for allocating compute and/or storage resources in a distributed computing system, in accordance with one or more techniques of the disclosure present. In various cases, process 1180 may be performed by a global orchestrator executing in a distributed computing system (e.g., global orchestrator 102; global orchestrator 302; global orchestrator 402).

In the example of FIG. 11, process 1180 includes receiving (1182), by an orchestrator (e.g., global orchestrator 102) executed by one or more processors (e.g., from client device 104), a resource request for at least one compute or storage resource from a distributed computing system (e.g., system 100) distributed among multiple data centers (e.g., data centers 112, 120), and determining (1184), by the orchestrator, a resource policy (e.g., one of resource policies 110) that is associated with the resource request, where the resource policy includes a rule specifying at least one metadata tag and at least one criterion associated with the at least one metadata tag. Process 1180 further includes identifying (1186), by the orchestrator, at least one object included in a resource object model (e.g., global resource object model 108) that complies with the rule of the resource policy, where the at least one object has an assigned value for the metadata tag that satisfies the at least one criterion, and where the resource object model includes one or more objects for respective resources in each of the multiple data centers. Process 1180 further includes selecting (1188), by the orchestrator, a data center (e.g., data center 120A) of the distributed computing system that is associated with the at least one object identified from the resource object model, and deploying (1190), by the orchestrator and on the selected data center, the at least one compute or storage resource (e.g., one or more of compute resources 124 and/or storage resources 126) in response to the resource request.

Example 1: A method comprising: receiving, by an orchestrator executed by one or more processors, a resource request for at least one compute or storage resource from a distributed computing system distributed among multiple data centers; determining, by the orchestrator, a resource policy that is associated with the resource request, wherein the resource policy includes at least one rule specifying at least one metadata tag and at least one criterion associated with the at least one metadata tag; identifying, by the orchestrator, at least one object included in a resource object model that complies with the at least one rule of the resource policy, wherein the at least one object has an assigned value for the metadata tag that satisfies the at least one criterion, and wherein the resource object model includes one or more objects for respective resources in each of the multiple data centers; selecting, by the orchestrator, a data center of the distributed computing system that is associated with the at least one object identified from the resource object model; and deploying, by the orchestrator and on the selected data center, the at least one compute or storage resource in response to the resource request.

Example 2: The method of Example 1, wherein deploying the at least one compute or storage resource comprises sending, by the orchestrator and to a local orchestrator for the selected data center, a request to allocate the at least one compute or storage resource for use by a client device.

Example 3: The method of any of Examples 1-2, further comprising: updating, by the orchestrator, the resource object model to add at least one new object for the at least one compute or storage resource, wherein the at least one new object is associated with the selected data center in the resource object model.

Example 4: The method of any of Examples 1-3, wherein the at least one criterion associated with the at least one metadata tag comprises at least one of a maximum threshold criterion, a minimum threshold criterion, or an equality criterion for at least one assigned value of the at least one metadata tag.

Example 5: The method of any of Examples 1-4, wherein determining the resource policy associated with the resource request is based on at least one of a location of a client device, a type of application associated with the resource request, a type of the at least one compute or storage resource indicated by the resource request, or a quantity of the at least one compute or storage resource indicated by the resource request.

Example 6: The method of any of Examples 1-5, wherein the at least one compute or storage resource comprises at least one of a workload or a storage volume, and wherein the workload comprises a virtual machine or a container.

Example 7: The method of any of Examples 1-6, wherein the resource object model includes a plurality of objects including the at least one object, wherein the plurality of objects includes one or more of a location object, an orchestrator object, a data center object, a storage volume object, a link object, an endpoint object, a virtual machine object, or a container object, and wherein each of the plurality of objects includes one or more metadata tags and corresponding assigned values.

Example 8: The method of Example 7, wherein the one or more metadata tags included in each of the plurality of objects comprise one or more of a latency tag, a number of replicas tag, a cost tag, a region tag, a provider tag, a compute class tag, a storage class tag, a type tag, a performance tag, or a direction tag.

Example 9: The method of any of Examples 7-8, further comprising: assigning, by the orchestrator, the corresponding assigned values of the one or more metadata tags of one or more objects of the plurality of objects included in the resource object model, wherein assigning the corresponding assigned values is based on one or more of (i) an automatic analysis of the one or more data centers included in the distributed computing system, or (ii) an input received from a client device.

Example 10: The method of Example 9, wherein assigning the corresponding assigned values further comprises: sending, by the orchestrator and to one or more local orchestrators of the one or more data centers, a request to perform one or more tests associated with operation of the one or more data centers; in response to sending the request, receiving, by the orchestrator and from the one or more local orchestrators, test results associated with the one or more tests; and updating, by the orchestrator and based on the test results, the corresponding assigned values of the one or more metadata tags of the one or more objects included in the resource object model.

Example 11: The method of any of Examples 1-10, further comprising: outputting, by the orchestrator and to a client device for display, a visual representation of the selected data center on which the at least one compute or storage resource has been deployed in response to the resource request.

Example 12: he method of any of Examples 1-11, wherein the at least one metadata tag comprises a plurality of multidimensional tags, wherein the rule comprises one or more rules, wherein the at least one criterion comprises a plurality of criteria associated with the plurality of multidimensional tags, and wherein the at least one object has assigned values for the plurality of multidimensional tags that satisfy the plurality of criteria.

Example 13: The method of any of Examples 1-12, wherein the one or more data centers comprise one or more of (i) at least one remote data center that is geographically remote from a customer site, or (ii) at least one on-premises data center that is geographically co-located with the customer site.

Example 14: The method of any of Examples 1-13, wherein the orchestrator comprises a virtual machine or a container provided by the one or more of the multiple data centers of the distributed computing system.

Example 15: A computing system, comprising: one or more processors; and at least one computer-readable storage medium storing instructions that, when executed, cause the one or more processors to: receive a resource request for at least one compute or storage resource from a distributed computing system distributed among multiple data centers; determine a resource policy that is associated with the resource request, wherein the resource policy includes a rule specifying at least one metadata tag and at least one criterion associated with the at least one metadata tag; identify at least one object included in a resource object model that complies with the rule of the resource policy, wherein the at least one object has an assigned value for the metadata tag that satisfies the at least one criterion, and wherein the resource object model includes one or more objects for respective resources in each of the multiple data centers; select a data center of the distributed computing system that is associated with the at least one object identified from the resource object model; and deploy, on the selected data center, the at least one compute or storage resource in response to the resource request.

Example 16: The computing system of Examiner 15, wherein the instructions, when executed, cause the one or more processors to perform the method of any of Examples 2-14.

Example 17: A computing system, comprising: one or more processors; and at least one computer-readable storage medium storing instructions that, when executed, cause the one or more processors to perform the method of any of Examples 1-14.

Example 18: A computer system comprising means for performing the method of any of Examples 1-14.

Example 19: A computer-readable storage medium storing instructions that are executable by at least one processor to: receive a resource request for at least one compute or storage resource from a distributed computing system distributed among multiple data centers; determine a resource policy that is associated with the resource request, wherein the resource policy includes a rule specifying at least one metadata tag and at least one criterion associated with the at least one metadata tag; identify at least one object included in a resource object model that complies with the rule of the resource policy, wherein the at least one object has an assigned value for the metadata tag that satisfies the at least one criterion, and wherein the resource object model includes one or more objects for respective resources in each of the multiple data centers; select a data center of the distributed computing system that is associated with the at least one object identified from the resource object model; and deploy, on the selected data center, the at least one compute or storage resource in response to the resource request.

Example 20: The computer-readable storage medium of Examiner 19, wherein the instructions are executable by the at least one processor to perform the method of any of Examples 2-14.

Example 21: A computer-readable storage medium storing instructions that are executable by at least one processor to perform the method of any of Examples 1-14.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

The invention claimed is:

1. A method comprising:
receiving, by an orchestrator executed by one or more processors, a resource request to deploy at least one compute or storage resource from a distributed computing system distributed among multiple data centers;
selecting, by the orchestrator and based on a geographic location of a client device originating the resource request, a resource policy from a plurality of different resource policies that is associated with the resource request, wherein the selected resource policy includes at least one rule specifying at least one metadata tag of a plurality of different metadata tags and at least one criterion associated with the at least one metadata tag;
identifying, by the orchestrator, at least one object included in a resource object model that complies with the at least one rule of the selected resource policy, wherein the at least one object has an assigned value for the at least one metadata tag that satisfies the at least one criterion of the selected resource policy, wherein the resource object model includes one or more objects for respective resources in each of the multiple data centers, wherein each of the one or more objects of the resource object model has one or more metadata tags of the plurality of different metadata tags and corresponding assigned values for the one or more metadata tags;
selecting, by the orchestrator, a data center of the multiple data centers that is associated with the at least one object identified from the resource object model; and
deploying, by the orchestrator and on the selected data center, the at least one compute or storage resource in response to the resource request.

2. The method of claim 1, wherein deploying the at least one compute or storage resource comprises sending, by the orchestrator and to a local orchestrator for the selected data center, a request to allocate the at least one compute or storage resource for use by a client device.

3. The method of claim 1, further comprising:
updating, by the orchestrator, the resource object model to add at least one new object for the at least one compute or storage resource, wherein the at least one new object is associated with the selected data center in the resource object model.

4. The method of claim 1, wherein the at least one criterion associated with the at least one metadata tag comprises at least one of a maximum threshold criterion, a minimum threshold criterion, or an equality criterion for at least one assigned value of the at least one metadata tag.

5. The method of claim 1, wherein selecting, based on the geographic location of the client device originating the resource request, the resource policy that is associated with the resource request comprises selecting, based on the geographic location of the client device originating the resource request and at least one of a type of application associated with the resource request, a type of the at least one compute or storage resource indicated by the resource request, or a quantity of the at least one compute or storage resource indicated by the resource request, the resource policy from the plurality of different resource policies that is associated with the resource request.

6. The method of claim 1,
wherein the at least one compute or storage resource comprises at least one of a workload or a storage volume, and
wherein the workload comprises a virtual machine or a container.

7. The method of claim 1,
wherein the one or more objects of the resource object model includes one or more of a location object, an orchestrator object, a data center object, a storage volume object, a link object, an endpoint object, a virtual machine object, or a container object.

8. The method of claim 7, wherein the one or more metadata tags included in each of the one or more of objects comprise one or more of a latency tag, a number of replicas tag, a cost tag, a region tag, a provider tag, a compute class tag, a storage class tag, a type tag, a performance tag, or a direction tag.

9. The method of claim 7, further comprising:
assigning, by the orchestrator, the corresponding assigned values of the one or more metadata tags of the one or more objects included in the resource object model,
wherein assigning the corresponding assigned values is based on one or more of (i) an automatic analysis of the multiple data centers included in the distributed computing system, or (ii) an input received from a client device.

10. The method of claim 9, wherein assigning the corresponding assigned values further comprises:
sending, by the orchestrator and to one or more local orchestrators of the multiple data centers, a request to perform one or more tests associated with operation of the multiple data centers;
in response to sending the request, receiving, by the orchestrator and from the one or more local orchestrators, test results associated with the one or more tests; and
updating, by the orchestrator and based on the test results, the corresponding assigned values of the one or more metadata tags of the one or more objects included in the resource object model.

11. The method of claim 1, further comprising:
outputting, by the orchestrator and to a client device for display, a visual representation of the selected data center on which the at least one compute or storage resource has been deployed in response to the resource request.

12. The method of claim 1, wherein the at least one metadata tag comprises a plurality of multidimensional tags, wherein the rule comprises one or more rules, wherein the at least one criterion comprises a plurality of criteria associated with the plurality of multidimensional tags, and wherein the at least one object has an assigned value for each of the plurality of multidimensional tags that satisfies each criteria of the plurality of criteria.

13. The method of claim 1, wherein the multiple data centers comprise one or more of (i) at least one remote data center that is geographically remote from a customer site, or (ii) at least one on-premises data center that is geographically co-located with the customer site.

14. The method of claim 1, wherein the orchestrator comprises a virtual machine or a container provided by the one or more of the multiple data centers of the distributed computing system.

15. The method of claim 1,
wherein the at least one metadata tag of the at least one rule of the selected resource policy comprises a performance tag and a region tag,
wherein the at least one criterion associated with the at least one metadata tag of the at least one rule of the selected resource policy comprises a first criterion associated with the performance tag and a second criterion associated with the region tag, and
wherein identifying the at least one object included in the resource object model that complies with the at least one rule of the selected resource policy comprises identifying the at least one object based on a determination that the at least one object has a first assigned value for the performance tag that satisfies the first criterion and a second assigned value for the region tag that satisfies the second criterion.

16. The method of claim 1,
wherein the at least one metadata tag of the at least one rule of the selected resource policy comprises a latency tag and a region tag,
wherein the at least one criterion associated with the at least one metadata tag of the at least one rule of the selected resource policy comprises a first criterion associated with the latency tag and a second criterion associated with the region tag, and
wherein identifying the at least one object included in the resource object model that complies with the at least one rule of the selected resource policy comprises identifying the at least one object based on a determination that the at least one object has a first assigned value for the latency tag that satisfies the first criterion and a second assigned value for the region tag that satisfies the second criterion.

17. A computing system, comprising:
one or more processors; and
at least one computer-readable storage medium storing instructions that, when executed, cause the one or more processors to:
receive a resource request to deploy at least one compute or storage resource from a distributed computing system distributed among multiple data centers;
select, based on a geographic location of a client device originating the resource request, a resource policy from a plurality of different resource policies that is associated with the resource request, wherein the selected resource policy includes a rule specifying at least one metadata tag of a plurality of different metadata tags and at least one criterion associated with the at least one metadata tag;
identify at least one object included in a resource object model that complies with the rule of the selected resource policy, wherein the at least one object has an assigned value for the at least one metadata tag that satisfies the at least one criterion of the selected resource policy, and wherein the resource object model includes one or more objects for respective resources in each of the multiple data centers, wherein each of the one or more objects of the resource object model has one or more metadata tags of the plurality of different metadata tags and corresponding assigned values for the one or more metadata tags;
select a data center of the multiple data centers that is associated with the at least one object identified from the resource object model; and
deploy, on the selected data center, the at least one compute or storage resource in response to the resource request.

18. The computing system of claim 17, wherein the instructions stored on the at least one computer-readable storage medium that cause the one or more processors to deploy the at least one compute or storage resource further cause the one or more processors to send, by the orchestrator and to a local orchestrator for the selected data center, a request to allocate the at least one compute or storage resource for use by a client device.

19. The computing system of claim 17,
wherein the one or more objects of the resource object model includes one or more of a location object, an orchestrator object, a data center object, a storage volume object, a link object, an endpoint object, a virtual machine object, or a container object.

20. The computing system of claim 19, wherein the instructions stored on the at least one computer-readable storage medium further cause the one or more processors to:
assign, by the orchestrator, the corresponding assigned values of the one or more metadata tags of the one or more objects included in the resource object model,
wherein assigning the corresponding assigned values is based on one or more of (i) an automatic analysis of the multiple data centers included in the distributed computing system, or (ii) an input received from a client device.

21. The computing system of claim 20, wherein the instructions stored on the at least one computer-readable storage medium that cause the one or more processors to assign the corresponding assigned values further cause the one or more processors to:
send by the orchestrator and to one or more local orchestrators of the multiple data centers, a request to perform one or more tests associated with operation of the multiple data centers;
in response to sending the request, receive, by the orchestrator and from the one or more local orchestrators, test results associated with the one or more tests; and
update, by the orchestrator and based on the test results, the corresponding assigned values of the one or more metadata tags of the one or more objects included in the resource object model.

22. A non-transitory computer-readable storage medium storing instructions that are executable by at least one processor to:
receive a resource request to deploy at least one compute or storage resource from a distributed computing system distributed among multiple data centers;
select, based on a geographic location of a client device originating the resource request, a resource policy from a plurality of different resource policies that is associated with the resource request, wherein the selected resource policy includes a rule at least one metadata tag of a plurality of different metadata tags and at least one criterion associated with the at least one metadata tag;
identify at least one object included in a resource object model that complies with the rule of the selected resource policy, wherein the at least one object has an assigned value for the at least one metadata tag that satisfies the at least one criterion of the selected resource policy, and wherein the resource object model includes one or more objects for respective resources in each of the multiple data centers, wherein each of the one or more objects of the resource object model has one or more metadata tags of the plurality of different metadata tags and corresponding assigned values for the one or more metadata tags;
select a data center of the multiple data centers that is associated with the at least one object identified from the resource object model; and
deploy, on the selected data center, the at least one compute or storage resource in response to the resource request.

* * * * *